(12) United States Patent
Kantani et al.

(10) Patent No.: US 11,414,331 B2
(45) Date of Patent: Aug. 16, 2022

(54) EFFLUENT TREATMENT METHOD FOR MEMBRANE SEPARATION ACTIVATED SLUDGE, EFFLUENT TREATMENT APPARATUS, AND EFFLUENT TREATMENT SYSTEM MANAGEMENT PROGRAM

(71) Applicant: TORAY INDUSTRIES, INC., Tokyo (JP)

(72) Inventors: Seiko Kantani, Shiga (JP); Kyoya Takemoto, Shiga (JP); Kazunori Tomioka, Shiga (JP); Yohito Ito, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 140 days.

(21) Appl. No.: 16/498,983

(22) PCT Filed: Mar. 28, 2018

(86) PCT No.: PCT/JP2018/013050
§ 371 (c)(1),
(2) Date: Sep. 27, 2019

(87) PCT Pub. No.: WO2018/181618
PCT Pub. Date: Oct. 4, 2018

(65) Prior Publication Data
US 2021/0107817 A1   Apr. 15, 2021

(30) Foreign Application Priority Data
Mar. 28, 2017  (JP) .............................. JP2017-062362

(51) Int. Cl.
*C02F 3/00* (2006.01)
*C02F 1/44* (2006.01)
(Continued)

(52) U.S. Cl.
CPC .............. *C02F 3/006* (2013.01); *C02F 1/444* (2013.01); *C02F 3/1273* (2013.01);
(Continued)

(58) Field of Classification Search
CPC ......... B01D 2311/04; B01D 2311/2688; C02F 3/12; C02F 2209/003; C02F 3/1273;
(Continued)

(56) References Cited

U.S. PATENT DOCUMENTS

| | | | |
|---|---|---|---|
| 2005/0117156 A1* | 6/2005 | Siepmann .......... | G01N 33/1886 356/436 |
| 2011/0060533 A1 | 3/2011 | Jorden et al. | |
| 2018/0111096 A1 | 4/2018 | Tanaka et al. | |

FOREIGN PATENT DOCUMENTS

| | | |
|---|---|---|
| CN | 103471991 A | 12/2013 |
| JP | 1-111491 A | 4/1989 |

(Continued)

OTHER PUBLICATIONS

International Search Report, issued in PCT/JP2018/013050, PCT/ISA/210, dated Jun. 12, 2018.
(Continued)

*Primary Examiner* — Claire A Norris
(74) *Attorney, Agent, or Firm* — Birch, Stewart, Kolasch & Birch, LLP

(57) ABSTRACT

Provided is an effluent treatment method based on a membrane separation activated sludge method, the effluent treatment method being characterized in that activated sludge collected from a membrane separation activated sludge tank is observed by an optical means, image processing is performed, and effluent treatment conditions are controlled in accordance with the results thereof.

7 Claims, 8 Drawing Sheets

(51) Int. Cl.
 *C02F 3/12* (2006.01)
 *G01N 15/02* (2006.01)
 *G01N 15/00* (2006.01)

(52) U.S. Cl.
 CPC ..... *G01N 15/0227* (2013.01); *G01N 15/0272* (2013.01); *C02F 2209/008* (2013.01); *C02F 2209/10* (2013.01); *C02F 2209/40* (2013.01); *C02F 2303/20* (2013.01); *G01N 2015/0053* (2013.01); *G01N 2015/0092* (2013.01)

(58) Field of Classification Search
 CPC ..... C02F 3/006; C02F 1/444; G01N 15/0227; G01N 15/0272
 USPC .................................................. 210/143, 614
 See application file for complete search history.

(56) References Cited

FOREIGN PATENT DOCUMENTS

| | | |
|---|---|---|
| JP | 1-194996 A | 8/1989 |
| JP | 2-229597 A | 9/1990 |
| JP | 6-114391 A | 4/1994 |
| JP | 3912535 B2 | 5/2007 |
| JP | 2013-22549 A | 2/2013 |
| JP | 2015-160283 A | 9/2015 |
| JP | 2015-181374 A | 10/2015 |
| JP | 5822264 B2 | 11/2015 |
| JP | 5868217 B2 | 2/2016 |
| WO | WO 2016/178366 A1 | 11/2016 |

OTHER PUBLICATIONS

Iwaho et al. "Support for Operation of Activated Sludge Method by Fuzzy Function Diagnostic System", Journal EICA, vol. 3, No. 2, (1998), p. 75-80.
Written Opinion of the International Searching Authority, issued in PCT/JP2018/013050, PCT/ISA/237, dated Jun. 12, 2018.
Indian Office Action for Indian Application No. 201947039099, dated Feb. 12, 2021, with English translation.
Indian Office Action for Indian Application No. 201947039099, dated Aug. 18, 2021, with English translation.
"Drainage works," Harbin Institute of Civil Engineering and Architecture, China Construction Industry Press, vol. 2, Second Edition, Jul. 1987, 5 pages, with English translation.
Chinese Office Action and Search Report for Chinese Application No. 201880022269.6, dated Jul. 28, 2021, with English translation.
Qiang, "Operating characteristics of composite membrane bioreactor and principle of membrane fouling control," Xuzhou Institute of Technology Academic Works Publication Fund Supported Publication National Spark Program, Jun. 2015, 14 pages, with English translation.
Yiming, "Membrane Bioreactor Technology," Environmental Hotspot Technology Series, Jan. 2007, 15 pages, with English translation.
Zhang et al., "Discriminant of activated sludge settling ability based on floc microscopic parameters," Acta Scientiae Circumstantiae, vol. 35, No. 12, Dec. 2015, 3815-3823 (24 pages total), with English translation.
Chinese Office Action for corresponding Chinese Application No. 201880022269.6, dated Feb. 16, 2022, with English translation.
Japanese Notice of Reasons for Refusal for Japanese Application No. 2018-525491, dated May 10, 2022, with an English translation.

\* cited by examiner

| ACTIVATED-SLUDGE AMOUNT | AQUEOUS-PHASE SUSPENDED MATTER AMOUNT |
|---|---|
| 28.5 | 30 |

| ACTIVATED-SLUDGE AMOUNT | AQUEOUS-PHASE SUSPENDED MATTER AMOUNT |
|---|---|
| 28.8 | 10 |

EFFLUENT TREATMENT METHOD FOR MEMBRANE SEPARATION ACTIVATED SLUDGE, EFFLUENT TREATMENT APPARATUS, AND EFFLUENT TREATMENT SYSTEM MANAGEMENT PROGRAM

TECHNICAL FIELD

The present invention relates to a wastewater treatment method, a wastewater treatment device, and a wastewater treatment system control program which are for use in treating sewage, industrial wastewater, or the like with membrane separation activated sludge.

BACKGROUND ART

Membrane separation methods are coming to be increasingly used in various fields because of advantages thereof such as energy saving, space saving, and improvements in filtrate water quality. For example, a membrane separation activated-sludge method which is used in treating sewage or industrial wastewater is a treatment method in which a biotreatment is conducted in a biological reaction tank and the activated sludge is removed by solid-liquid separation using filtration membranes or the like immersed in the reaction tank, thereby obtaining clarified treated water.

In such a membrane separation activated-sludge method, in order to prevent activated sludge itself or solid matter, such as impurities contained in the water to be treated flowing into the reaction tank from adhering to the surfaces of the separation membranes and reducing the filtration efficiency, filtration is conducted while diffusing air or the like with aeration tubes disposed under the filtration membranes and while removing the adherent substances from the separation membrane surfaces by the separation-membrane vibrating effect and stirring effect of the resultant air bubbles and ascending flows.

However, in cases when water to be treated is filtered with the membranes, the accumulation amount of fouling substances on the membrane surfaces and in the membrane pores increases along with the treated water amount, and this poses a problem concerning a decrease in treated water amount or water quality or an increase in membrane filtration pressure. For keeping the membrane filtration pressure low over a prolonged period and continuously performing a stable operation, it is important to monitor the state of the activated sludge so that the state thereof is kept suitable for membrane filtration.

Techniques for monitoring the state of activated sludge which have been proposed so far include a technique for use in the conventional biotreatment method based on sedimentation, in which, either flocs (aggregates) themselves of activated sludge or filamentous microorganisms causative of disaggregation of flocs and poor sedimentation are evaluated using a microscope for the purpose of monitoring the flocs to determine the tendency to sedimentation thereof.

Patent Document 1 proposes a technique for evaluating floc denseness, and Patent Document 2 proposes a technique in which the amount of filamentous microorganisms is evaluated and the amount of a flocculant to be added is assessed accordingly. Patent Documents 3 and 4 propose an examination jig and a system for continuously imaging activated sludge with high accuracy to quantify characteristic amounts such as the amount in which filamentous microorganisms or microscopic animals have moved. Patent Document 5 proposes a technique in which a change in floc diameter is evaluated using an optical sensor. Non-Patent Document 1 proposes a control technique for an activated-sludge method, which is based on a fuzzy diagnosis. Furthermore, Patent Document 6 proposes a technique for monitoring the state of activated sludge which changes with changing water temperature and fluctuating load in a membrane separation activated-sludge method, the technique including separating the activated sludge beforehand into flocs (aggregates) and an aqueous phase, monitoring the difference in organic-matter concentration between the aqueous phase of the activated sludge and the membrane filtrate water, and regulating the concentration of the activated sludge. Patent Document 7 proposes a technique in which the organic-matter concentration of the aqueous phase of activated sludge is monitored and when the concentration thereof has exceeded a given value, the amount of the air being diffused into the tank is increased to thereby inhibit the membrane filtration pressure from increasing.

CITATION LIST

Patent Literature

Patent Document 1: JP-A-2-229597
Patent Document 2: JP-A 1-111491
Patent Document 3: JP-A-2015-181374
Patent Document 4: JP-A-2015-160283
Patent Document 5: JP-B2-3912535
Patent Document 6: JP-B2-5822264
Patent Document 7: JP-B2-5868217

Non-Patent Literature

Non-Patent Document 1: academic journal "EICA", Case 3, No. 2 (1998), Operation Aid for Activated-Sludge Method by Fuzzy Function Diagnosis System

SUMMARY OF INVENTION

Technical Problem

Membrane separation activated-sludge methods differ in solid-liquid separation mode from conventional biotreatment methods based on sedimentation. According to findings made by the present inventors, it is desirable that the activated sludge in a membrane separation activated-sludge method is controlled on the basis of not the tendency to sedimentation of the flocs but the evaluation of the clarity of the aqueous phase of the activated sludge, i.e., the presence of aqueous-phase suspended matter which has a size close to the membrane pore size and is prone to clog the membranes. For preventing the membrane filtration pressure from increasing and for obtaining stable filtrate water quality, it is important to control the operation of the activated-sludge tank to keep the aqueous phase of the activated sludge clarified and to diminish aqueous-phase suspended matter as much as possible by biodegradation.

In the technique disclosed in Patent Document 1, in which the denseness of flocs is evaluated, information on aqueous-phase suspended matter is not obtained because the monitored object differs. The technique of Patent Document 2 has a drawback in that since the amount of filamentous microorganisms, which are apt to become dominant species in activated sludge where the flocs have a deteriorated tendency to sediment, is monitored and a flocculant is added accordingly, there are cases where the flocculant itself is causative of an increase in membrane filtration pressure.

This technique hence is not applicable to membrane separation activated-sludge methods.

In Patent Documents 3 and 4, an examination jig having an evaluation channel is used to continuously examine activated sludge and monitor the amount of filamentous microorganisms and the amount in which active microscopic animals have moved, but the monitored objects differ. Namely, no information on aqueous-phase suspended matter is obtained and the techniques cannot be utilized in operation control for inhibiting the membrane filtration pressure from increasing.

The technique of Patent Document 5, in which a change in floc diameter is evaluated using an optical sensor, is capable of detecting changes as a whole. However, this technique is unable to distinguish the existence therein of aqueous-phase suspended matter which is apt to clog the membranes, and is hence not utilizable in operation control for inhibiting the membrane filtration pressure from increasing.

In the techniques of Patent Documents 6 and 7, the organic-matter concentration of the aqueous phase of activated sludge and that of membrane filtrate water are measured with an analytical instrument and, in accordance with the concentration difference therebetween, control is performed to regulate the amount of aeration for membrane surface cleaning and to regulate the concentration of the activated sludge to be filtered. This method, however, requires much time for the measurement with an analytical instrument and necessitates much time before the operation control. In addition, since the information on organic-matter concentrations is the only information obtainable, there are cases where optimal operation control is impossible.

In the technique of Non-Patent Document 1, an examination of microorganisms is conducted by fuzzy function diagnosis. However, the increase in membrane filtration pressure in a membrane separation activated-sludge method is not entirely due to the kinds and number of microorganisms present in the activated sludge, and the monitored object differs. This technique hence has a problem in that it cannot be utilized in operation control for inhibiting the membrane filtration pressure from increasing.

The present invention is intended to improve a method for operating an organic-wastewater treatment tank using a wastewater treatment device which includes: a biotreatment tank in which organic wastewater, such as sewage or industrial wastewater, is treated with activated sludge; and a membrane filtration device whereby the activated sludge in the biotreatment tank is subjected to solid-liquid separation. Specifically, the state of the activated sludge is continuously monitored and aqueous-phase suspended matter, which is causative of an increase in membrane filtration pressure, is easily and instantly visualized and quantified. An object of the present invention is to provide a wastewater treatment method in which proper operation control is performed using that information before the occurrence of any abnormality, such as an increase in membrane filtration pressure or a deterioration in filtrate water quality, to keep the sludge in a state suitable for membrane filtration and thereby render long-term stable membrane filtration possible.

Solution to Problem

The present invention includes the following constitutions to solve the above problems.
(1) A wastewater treatment method based on a membrane separation activated-sludge method, including: taking, with an optical means, an image of an activated sludge collected from a membrane separation activated-sludge tank; processing the image taken; and comparing a control parameter determined from information on the processed image with a preset control reference range to assess an operating state of the membrane separation activated-sludge tank.
(2) The wastewater treatment method based on a membrane separation activated-sludge method according to (1), including: taking, with an optical means, an image of an activated sludge collected from a membrane separation activated-sludge tank; processing the image taken to distinguish a floc region from an aqueous-phase region; acquiring image information on at least one region of the floc region and the aqueous-phase region; determining a control parameter from the image information through a calculation satisfying at least one of the following requirements; and comparing the calculated value and/or a change amount in the calculated value with the lapse of time, with a preset control reference range to assess a state of the activated sludge:
(a) the control parameter is calculated from an image information element determined separately for the floc region or the aqueous-phase region;
(b) at least two control parameters calculated from an image information element determined separately for the floc region or the aqueous-phase region are combined for each kind of regions;
(c) at least two image information elements determined separately for the floc region or the aqueous-phase region are combined to calculate the control parameter; and
(d) at least two of the values calculated in (a) to (c) are combined to calculate the control parameter.
(3) The wastewater treatment method according to (1) or (2), in which the control parameter for the floc region and/or the aqueous-phase region is any of a total value, a maximum value, a minimum value, an average value, a median value, and a deviation value each regarding at least any of area, circumference length, distance between the floc regions, the number of the region, and brightness.
(4) The wastewater treatment method according to any one of (1) to (3), including: calculating a total area of the floc region per unit area of a field of view; and comparing the calculated value and/or a change amount in the calculated value with the lapse of time with a preset control reference range to perform the assessment.
(5) The wastewater treatment method according to any one of (1) to (4), including: calculating a total area of the floc regions each having an area not larger than a certain value and surrounded by an aqueous-phase region, per unit area of a field of view; and comparing the calculated value and/or a change amount in the calculated value with the lapse of time with a preset control reference range to perform the assessment.
(6) The wastewater treatment method according to any one of (1) to (5), in which, in taking the image of the activated sludge collected from the membrane separation activated-sludge tank, the image is taken after at least any one of a liquid mixture obtained by mixing the activated sludge with a membrane filtrate water, an aqueous phase portion obtained by centrifuging the activated sludge, and the filtrate water obtained through filtration is degassed and/or stirred.
(7) The wastewater treatment method according to any one of (1) to (6), including: in a case when the control parameter has been assessed to be outside the control reference range, outputting an alarm and/or a control information regarding a wastewater treatment condition.
(8) The wastewater treatment method according to any one of (1) to (7), in which the wastewater treatment condition, regarding which the alarm and/or the control information is output when the control parameter has been assessed to be outside the control reference range, is at least any one of the following:

(A) concentration of inflow water to be treated and inflow rate,
(B) filtration rate,
(C) filtration period or filtration suspension period,
(D) aeration-air feed rate or aeration period,
(E) nutrient salt addition amount,
(F) chemical addition amount,
(G) amount of activated sludge,
(H) treated-water return rate,
(I) operating conditions for pretreatment step,
(J) operating conditions for post-treatment step,
(K) temperature regulation conditions for activated-sludge tank,
(L) operating conditions for membrane elements,
(M) cleaning conditions for membrane elements, and
(N) cleaning conditions for aeration tubes.

(9) The wastewater treatment method according to (7) or (8), in which the assessment is made at a place which is remote from a place where the image of the activated sludge collected from the membrane separation activated-sludge tank is taken and which has been connected to said place by a communication appliance, thereby outputting the alarm and/or the control information.

(10) The wastewater treatment method according to any one of (7) to (9), including controlling the wastewater treatment condition on the basis of the control information output.

(11) The wastewater treatment method according to (10), including: assessing a mixed liquor suspended solid concentration (MLSS) on the basis of the control parameter obtained; and when the result is higher than the preset control reference range, performing an activated-sludge withdrawal operation and when the result is lower than the preset control reference range, performing an activated-sludge concentration operation.

(12) The wastewater treatment method according to (10) or (11), including: taking, with an optical means, the image of the activated sludge collected from the membrane separation activated-sludge tank; processing the image to assess an aqueous-phase suspended matter amount in the activated sludge; and when the result is higher than the preset control reference range, performing an operation for reducing a water-to-be-treated inflow rate and/or a filtration rate and when the result is lower than the preset control reference range, performing an operation for increasing the water-to-be-treated inflow rate and/or the filtration rate.

(13) A wastewater treatment device for treating wastewater using a membrane separation activated-sludge method, including: a means for collecting an activated sludge from a membrane separation activated-sludge tank; an imaging means which takes an image of the collected activated sludge with an optical means; an image processing means which distinguishes a floc region from an aqueous-phase region in the image taken, acquires image information on at least one region of the floc region and the aqueous-phase region, and determines a control parameter from the image information through a calculation satisfying at least one of the following requirements; and an assessment means which assesses an operating state of the membrane separation activated-sludge tank, on the basis of the calculated control parameter and/or a change amount in the control parameter with the lapse of time:
(a) the control parameter is calculated from an image information element determined separately for the floc region or the aqueous-phase region;
(b) at least two control parameters calculated from an image information element determined separately for the floc region or the aqueous-phase region are combined for each kind of regions;
(c) at least two image information elements determined separately for the floc region or the aqueous-phase region are combined to calculate the control parameter; and
(d) at least two of the values calculated in (a) to (c) are combined to calculate the control parameter.

(14) The wastewater treatment device according to (13), in which the assessment means has been disposed at a place which is remote from a place where the image of the activated sludge collected from the membrane separation activated-sludge tank is taken and which has been connected to said place by a communication appliance, and the assessment means includes an output means which outputs an alarm and/or a control condition when a result of the assessment is outside a preset control reference range and a control means which performs control in accordance with any of the output control condition.

(15) A wastewater treatment system control program for controlling a wastewater treatment system for treating wastewater using a membrane separation activated-sludge method, including making a computer to: control a means for collecting an activated sludge from a membrane separation activated-sludge tank, an imaging means which takes an image of the collected activated sludge with an optical means, and an image processing means which distinguishes a floc region from an aqueous-phase region in the image taken, acquires image information on at least one region of the floc region and the aqueous-phase region, and determines a control parameter from the image information through a calculation satisfying at least any one of the following requirements; and operate as an assessment means which assesses an operating state of the membrane separation activated-sludge tank, on the basis of the calculated control parameter and/or a change amount in the control parameter with the lapse of time:
(a) the control parameter is calculated from an image information element determined separately for the floc region or the aqueous-phase region;
(b) at least two control parameters calculated from an image information element determined separately for the floc region or the aqueous-phase region are combined for each kind of regions;
(c) at least two image information elements determined separately for the floc region or the aqueous-phase region are combined to calculate the control parameter; and
(d) at least two of the values calculated in (a) to (c) are combined to calculate the control parameter.

Advantageous Effects of Invention

The present invention provides a membrane separation activated-sludge method in which aqueous-phase suspended components of activated sludge, which are causative of an increase in membrane filtration pressure, are easily and instantly visualized and quantified and are monitored for an increase or decrease thereof, thereby performing a suitable operation control before the occurrence of an increase in membrane filtration pressure to render long-term stable membrane filtration operation possible.

DESCRIPTION OF EMBODIMENTS

Figure 1A:
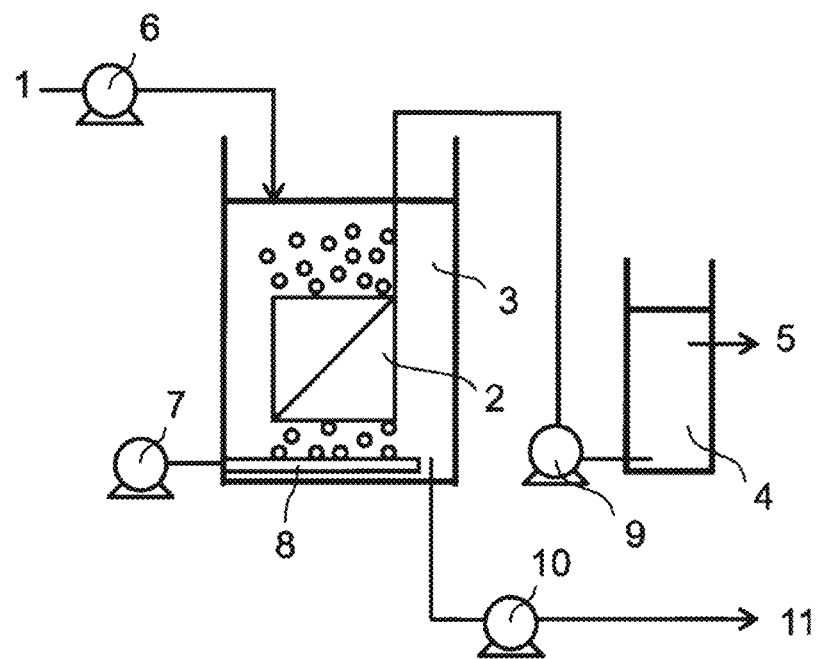
FIG. 1A is an example illustrating a wastewater treatment flow in a membrane separation activated-sludge method.
Figure 1B:
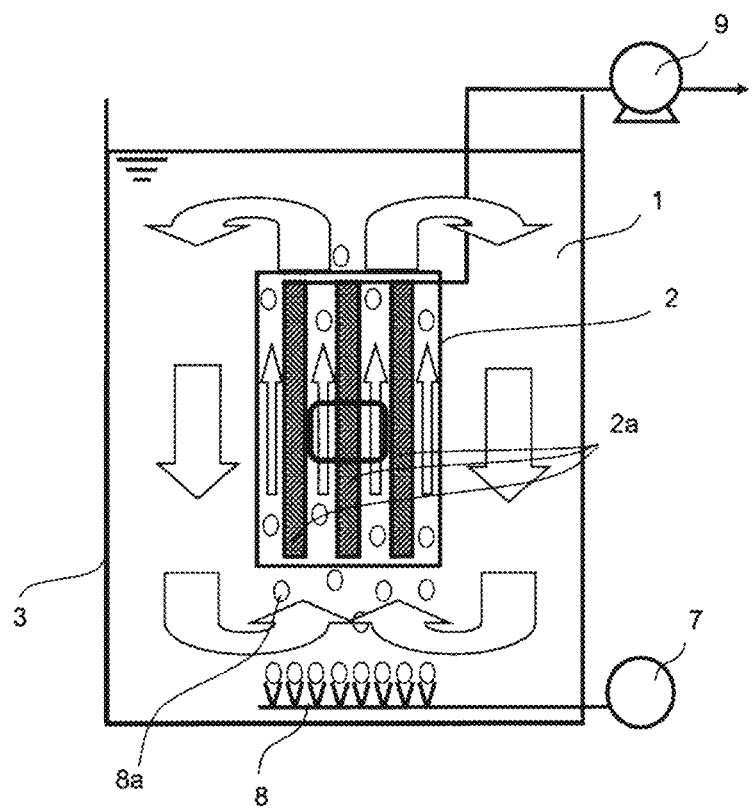
FIG. 1B is an example illustrating flows of water to be treated in an activated-sludge tank in the membrane separation activated-sludge method.

FIG. 1A and FIG. 1B diagrammatically illustrate a flow of a general membrane separation activated-sludge treatment which is used in a preferred embodiment of the present invention.

First, wastewater 1 is supplied to a membrane separation activated-sludge tank 3 with a raw-water feed pump 6 and is treated by removing organic substances, nitrogen, etc. from the wastewater by adsorption onto the activated sludge and degradation action by microorganisms. Subsequently, the activated sludge is filtered with an immersion type membrane separation unit 2, and the resultant filtrate water 5 is stored in a filtrate water tank 4 and is thereafter reused or discharged.

In a conventional sedimentation-separation type standard activated-sludge method, the mixed liquor suspended solid concentration (MLSS) is controlled so as to be about 1,500-8,000 mg/L in order to sediment and separate the sludge to obtain treated water. Meanwhile, in the membrane separation activated-sludge method, the sludge concentration within the tank can be heightened because the separation is performed with membranes, and the treatment tank is operated so that the mixed liquor suspended solid concentration (MLSS) therein is about 3,000-25,000 mg/L, more preferably about 7,000-18,000 mg/L. Because of the different modes of solid-liquid separation, indexes for controlling the state of the activated sludge must be suitable for the respective methods. In order to filter the activated sludge with the immersion type membrane separation unit, a pump or the like may be disposed between the immersion type membrane separation unit 2 and the filtrate water tank 4, or the filtrate-water level within the filtrate water tank 4 may be regulated so as to be below the water level of the activated sludge 1 within the activated-sludge tank 3 so that a water head pressure difference is caused. In FIG. 1A and FIG. 1B, filtration is performed with a suction pump 9. The membrane separation activated-sludge tank 3 is not particularly limited so long as the tank can contain activated sludge and the immersion type membrane separation unit 2 can be immersed therein. It is preferred to use a concrete tank, a fiber-reinforced plastic tank, or the like. The inside of the membrane separation activated-sludge tank 3 may have been partitioned into a plurality of vessels. Use may be made of a configuration in which some of the plurality of vessels formed by partitioning is used as a tank where the immersion type membrane separation unit 2 is immersed and another is used as a denitrification tank or a biotreatment tank to circulate activated sludge through the separate tanks.

During a filtration operation (operation in which filtration is performed with air supply), air supply is continuously and always conducted with an air pump (air supply device) 7 through aeration tubes 8 disposed under the immersion type membrane separation unit 2, in order to supply oxygen to the activated sludge and remove activated sludge adherent to the separation membrane elements in the immersion type membrane separation unit. In the case where the separation membrane elements are flat membranes, air bubbles 8a sent from the aeration tubes pass through the gap between a flat-membrane element and an adjacent flat-membrane element 2a together with an upward flow of activated sludge to remove activated sludge adherent to the membrane surfaces from the membrane surfaces. The activated sludge to be introduced into the membrane separation activated-sludge tank 3 is one in general use for wastewater treatments, etc., and sludge such as, for example, one withdrawn from other wastewater treatment facilities is usually used as seed sludge. The activated-sludge method renders water purification possible by causing microorganisms to utilize, as feed, highly biodegradable organic substances contained in the wastewater.

The filtrate water tank 4 is not particularly limited so long as filtrate water can be stored therein. It is preferred to use a concrete tank, a fiber-reinforced plastic tank, or the like.

Figure 1C:
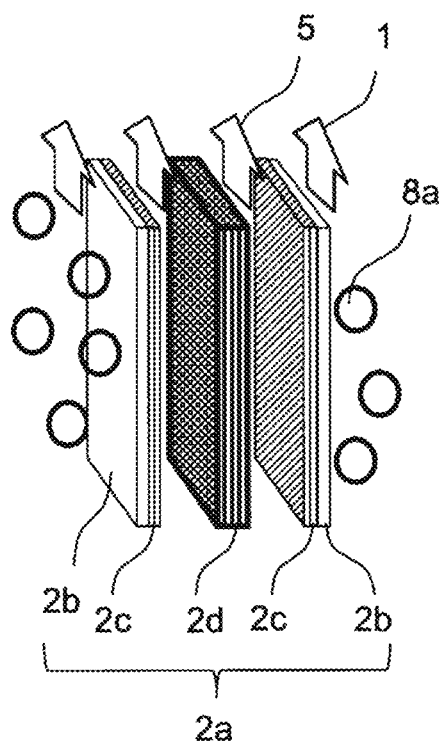
FIG. 1C is an example illustrating an enlarged view of a part of a flat-membrane element in the membrane separation activated-sludge method.

The membranes to be used in membrane elements which constitute the immersion type membrane separation unit 2 in this embodiment are not particularly limited and may be either flat membranes or hollow-fiber membranes. In FIG. 1C is illustrated an example of flat-membrane elements suitable for use in this embodiment. The structure of the elements is not particularly limited. For example, use may be made of any of: a flat-membrane element structure composed of a frame 5 and flat membranes bonded to both surfaces thereof; a flat-membrane element structure including a flat membrane that has been spirally wound; a flexible flat-membrane element structure that includes a flat-membrane pair, which includes two flat membranes disposed so that the permeate-side surfaces thereof face each other and a water collection channel disposed between the flat membranes, and a sealing part which tightly fills the space between the flat membranes in peripheral portions of the flat membranes; and a hollow-fiber-membrane element structure including a bundle of a plurality of hollow-fiber membranes. A flat membrane suitable for use in this embodiment includes a base 2c and a separation functional layer 2b, and a layer in which the resin constituting the separation functional layer has intermingled with the base may be interposed between the base 2c and the separation functional layer 2b. The separation functional layer may have a structure which is symmetrical or unsymmetrical with respect to the base.

In the flat membrane configured of the separation functional layer 2b and the base 2c, the base 2c has the function of supporting the separation functional layer 2b to impart strength to the flat membrane. The material constituting the base 2c is not particularly limited and the base 2c may be an organic base, an inorganic base, etc. However, an organic base is preferred from the standpoint of the ease of attaining a weight reduction. Examples of the organic base include woven or knit fabric and nonwoven fabric which are configured of organic fibers such as cellulose fibers, cellulose triacetate fibers, polyester fibers, polypropylene fibers, and polyethylene fibers. Especially preferred of these are the nonwoven fabric, with which density control is relatively easy.

The thickness of the separation functional layer 2b of the flat membrane is desirably selected in the range of 0.001-0.5 mm (1-500 μm), more preferably 0.05-0.2 mm (50-200 μm), from the standpoint of maintaining the membrane durability and filtration performance. As the separation functional layer, a crosslinked polymer is preferably used from the standpoints of pore diameter control and durability. Suitable from the standpoint of component-separating performance is a membrane formed by superposing a separation functional layer formed by condensation-polymerizing a polyfunctional amine with a polyfunctional acid halide on a porous supporting layer, and an organic/inorganic hybrid functional layer or the like. It is also possible to use a membrane which is a porous supporting layer and has both separating function and supporting function, such as a cellulose membrane, poly(vinylidene fluoride) membrane, polyethersulfone membrane, or polysulfone membrane. Use may also be made of a membrane achieving both a separation functional layer and a porous supporting layer as a single layer.

The flat membrane may be applied as either an ultrafiltration membrane or a microfiltration membrane. In accordance with the sizes of substances to be separated, two or more kinds of appropriate membranes may be selected and combined. The microfiltration membranes to be used in the immersion type membrane separation unit 2 are ones having a pore diameter of about 0.01-10 have larger pore sizes than the ultrafiltration membranes generally used for separation by molecular sieving, and usually, is served in an operation at an operating pressure of from a reduced-pressure state to 200 kPa or less.

In this embodiment, a plurality of such immersion type membrane separation units 2 may be immersed in an activated sludge tank so that the units are arranged side by side or are stacked. In the case of the side-by-side arrangement, the plurality of immersion type membrane separation units may be arranged so that the side faces thereof which are parallel with the direction of packing of a plurality of the flat-membrane elements adjoin each other. In the case of the stacking arrangement, the plurality of immersion type membrane separation units may be stacked so that the surfaces thereof which are perpendicular to the direction of the packing of a plurality of the flat-membrane elements adjoin each other vertically. In wastewater treatment methods based on the membrane separation activated-sludge method, the term "stable operation" means the state in which throughout the operation period, the filtration pressure does not increase exceeding a preset control range and the treated-water quality does not become outside a preset control range. Since a deterioration in the state of the activated sludge, which is to be filtered, leads to an increase in membrane filtration pressure, it is important to stably maintain and control the state of the activated sludge. Indexes to the state of the activated sludge are not particularly limited, and examples thereof include activated-sludge amount, viscosity, and aqueous-phase suspended matter amount. Information on these factors is comprehensively assessed to control the state of the activated sludge.

For measuring the activated-sludge amount, use has hitherto been made of the evaporation residue determination method, activated-sludge suspended substance determination method, etc. which are methods for measuring mixed liquor suspended solid concentration (MLSS) described in Sewage Test Methods (1997 edition) (published by Japan Sewage Works Association). In these methods for measuring mixed liquor suspended solid concentration (MLSS), activated sludge is subjected to solid-liquid separation by centrifuging or with glass-fiber filter paper, the resultant residual solid is dried by heating at 105-110° C. for about 2 hours, and the concentration of suspended substances is calculated from the mass of the dried solid. There are cases where a commercial mixed liquor suspended solid concentration (MLSS) meter is used.

For measuring the viscosity, use is made of a commercial viscometer such as a capillary viscometer, falling ball viscometer, co-axial double-cylinder rotational viscometer, single-cylinder rotational viscometer, cone-plate rotational viscometer, or oscillational viscometer. Suitable for activated sludge, among these, is a co-axial double-cylinder rotational viscometer, a single-cylinder rotational viscometer, or a cone-plate rotational viscometer. An accessory rotor is immersed in the activated sludge and the indicated value is read to measure the viscosity. Based on a relationship between viscosity and indicated value, determined beforehand, of standard liquids for calibration having controlled temperatures and concentrations, the indicated value may be converted into an apparent viscosity.

Activated sludge is composed of: a solid phase called flocs; and an aqueous phase and aqueous-phase suspended matter other than the flocs. The term "flocs" means aggregates in activated sludge which are composed of solids such as microorganisms, metabolites and dead bodies thereof, inclusions contained in inflow water, precipitates, etc. The term "aqueous phase" means the water in activated sludge which lies around the flocs and in interstices within the flocs.

Most of the flocs have a size of about 1-1,000 μm in terms of diameter. Examples include flocs having a particle-size distribution which has a maximal value at, in particular, 10-100 μm.

Meanwhile, there are the dead bodies and metabolites of microorganisms that have been yielded and the like which are present as colloidal-state or suspended matters in the aqueous phase without having been incorporated into the flocs. Examples thereof include ones having a size of 50 μm or less, more preferably 10 μm or less, even more preferably 1 μm or less, in terms of diameter. In the present invention, ones not smaller than a given size are referred to as flocs and ones smaller than the given size are referred to as aqueous-phase suspended matter and distinguished from the flocs. Typically, a given size serving as a border line for the distinguishing is set within the diameter range of 1-50 μm as above. However, the given size may be suitably set in accordance with the state of the activated sludge.

In an embodiment of the present invention, an image of activated sludge collected from a membrane separation activated-sludge tank is taken with an optical means and the image is processed to determine the aqueous-phase suspended matter amount in the activated sludge. Any amount which correlates with the proportion of the area of floc regions each having an area not larger than a given value to the area of aqueous-phase regions may be used as the aqueous-phase suspended matter amount in the activated sludge. For example, use may be made of: the total area of floc regions each having an area not larger than a given value and present in an aqueous-phase region; or the ratio of the area of the floc regions each having an area not larger than the given value to the area of aqueous-phase regions; or a ratio calculated from the area of aqueous-phase regions which includes the area of floc regions each surrounded by an aqueous-phase region. Especially in the case where the total amount of the activated sludge fluctuates, use of an areal ratio is suitable for distinguishing the fluctuations from fluctuations in aqueous-phase suspended matter amount.

When a filtration operation is being performed in a membrane separation activated-sludge tank, flocs are removed from the membrane surfaces by spiral flows generated by aeration, and the aqueous phase and aqueous-phase suspended matter contained in the aqueous phase and having a size not larger than the pore diameter of the membranes pass through the membranes and are discharged as membrane filtrate water. In this embodiment, the term "activated sludge in a stable state" means activated sludge in a state in which biotreatment with microorganisms is being performed satisfactorily and the dead bodies and metabolites of microorganisms that have been yielded are degraded by other microorganisms and incorporated into flocs and the amount of aqueous-phase suspended matter is small. Meanwhile, in a case where a balance among the biotreatment conditions has been disturbed by fluctuations in water temperature, fluctuations in water quality, etc., the dead bodies and metabolites of microorganisms are yielded in an increased amount so that the rate of degradation thereof or incorporation into flocs becomes insufficient, resulting in an increase in aqueous-phase suspended matter amount or in dispersion of flocs. As the aqueous-phase suspended matter amount increases, the aqueous-phase suspended matter, when passing through the membranes, is more prone to adhere to or accumulate on the surfaces of the membranes or in the pores thereof to clog the membranes. In the present invention, such activated sludge is called "activated sludge in a deteriorated state". A method has been employed in which whether the activated sludge in a membrane separation activated-sludge method is in a satisfactory state or not is assessed on the basis of the total amount of aqueous-phase suspended matter.

For measuring the aqueous-phase suspended matter amount, use is made of, for example, the dissolved-matter determination method or the like described in Sewage Test Methods (1997 edition) (published by Japan Sewage Works Association). In the method, solid-liquid separation is performed by centrifuging or with glass-fiber filter paper or quantitative filter paper, the aqueous phase is then dried by heating at 105-110° C. for about 2 hours, and the aqueous-phase suspended matter concentration is calculated from the mass. Also used is a method in which the filtrate obtained by the solid-liquid separation with quantitative filter paper is examined, as an aqueous phase, for turbidity with a commercial scattered-light turbidity meter. Furthermore, a technique is employed in which TOC (total organic carbon) is measured in place of turbidity and the aqueous-phase suspended matter amount is assessed on the basis of a tendency that as the amount of the dead bodies and metabolites of microorganisms increases, the TOC concentration relatively increases.

These methods each necessitate the operation of taking the aqueous phase out of activated sludge by solid-liquid separation in advance. Because of this, not only much time is required from collection of the activated sludge to acquisition of the results but also the total amount of aqueous-phase suspended matter is the only information obtainable. For controlling the state of the activated sludge in a manner suitable for inhibiting the differential pressure for the membranes from increasing, in the membrane separation activated-sludge method, it is necessary to obtain information not only on aqueous-phase suspended matter amount but also on activated-sludge amount, etc. It is hence necessary to conduct the MLSS measurement described above. Consequently, there has been a problem in that much time is required for comprehensively evaluating the state of the activated sludge after the results of all these measurements have been obtained and it is hence late to perform control for a measure.

In the present invention, investigations were diligently made on whether the state of activated sludge could be comprehensively assessed immediately after collection of the activated sludge. As a result, it has been found that by visualizing activated sludge using a microscope as an optical means and analyzing the image, information on both aqueous-phase regions and floc regions can be simultaneously acquired to make it possible to instantly and comprehensively assess the state of the activated sludge.

Preferred embodiments of the present invention are described in detail below.

Figure 2:
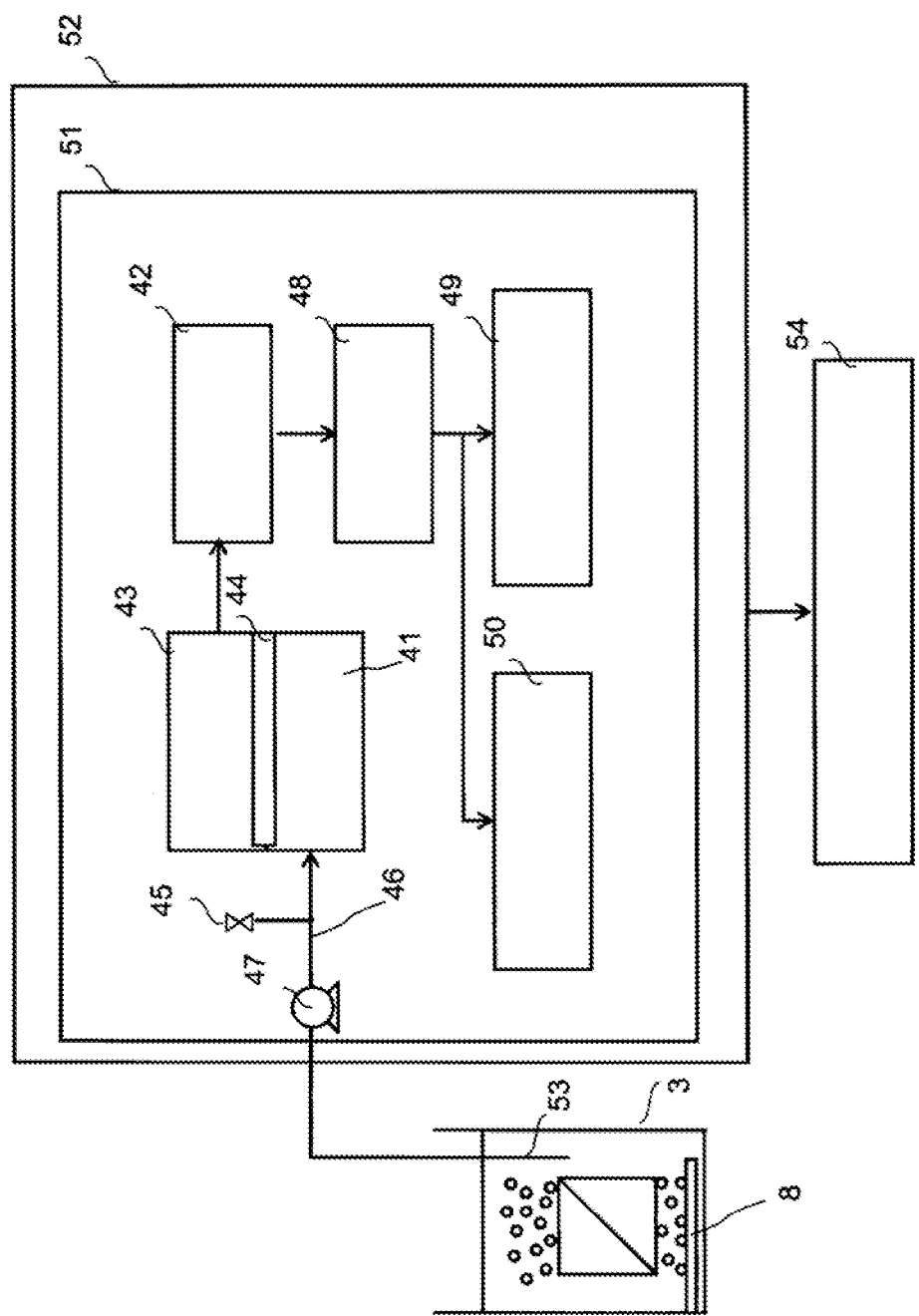
FIG. 2 is a diagrammatic view illustrating an embodiment of the present invention.

An embodiment of the present invention is explained using FIG. 2. A wastewater treatment method according to the present invention, which is based on a membrane separation activated-sludge method, includes collecting activated sludge from a membrane separation activated-sludge tank 3, taking an image of the activated sludge using an imaging means including an optical means (optical microscope) 41 and a camera (imaging means) 43, processing the image with an image processing means 42 under preset conditions, and making a comparison with a preset control reference range by an assessment means 48 to assess whether or not the current state of the activated sludge is within the control reference range, in order to detect a deterioration in the state of the activated sludge, which is causative of an increase in membrane filtration pressure, before the occurrence of an increase in membrane filtration pressure.

As the optical means 41, a microscope is used for visualization. The microscope is not particularly limited and may be of the transmission type or the reflected light type. Use can be made of any of a stereomicroscope, a phase-contrast microscope, a differential interference microscope, a fluorescence microscope, a transmission or scanning electron microscope, and the like. Most suitable of these is a transmission phase-contrast microscope, from the standpoints of the object to be examined in the present invention and operability regarding, for example, the ability to enable direct examination without any pretreatment.

In the case of examining activated sludge with a microscope and taking an image thereof with a camera 43, use may be made of a method in which the activated sludge to be examined is dropped, in a given amount, onto a slide glass, a cover glass is placed thereon, and this slide glass is placed on the stage of the microscope for the examination. Use may also be made of a method in which the activated sludge is continuously sent to the gap between two glass plates and examined appropriately. Furthermore, the special examination jig 44 which will be described later may be used.

The camera 43 may be either a color camera or a monochrome camera. However, a color camera is preferred from the standpoint of obtaining the color tone or the like of the activated sludge as numerical information. A camera having a calculation function is suitable because a captured image can be processed under preset conditions to instantly obtain a numerical value.

In this embodiment, flocs having a diameter of 50 µm or larger are distinguished from aqueous-phase suspended matter having a diameter of less than 50 µm, and the resolution of the camera 43 is therefore only required to be such that those can be examined and imaged. From the standpoints of recognizing and distinguishing flocs and aqueous-phase suspended matter and of performing image processing for separating from imaging noises, it is preferable to image with 2 pixels by 2 pixels or more. The space resolution in the field of view is preferably 500 nm/pixel or less, more preferably 300 nm/pixel or less.

In this embodiment, it is most preferable that the optical means 41 and the camera 43 include a wavelength selection means which transmits light having wavelengths in the range of 500-800 nm, a phase-contrast generation means which causes the light to have a phase difference when passing through an object to be imaged, and an imaging means which captures transmitted light in which the phase difference has been caused by the phase-contrast generation means and which acquires an image.

The image processing means 42 preferably includes: an element extraction means which extracts image information element(s) in the wavelength range of 500-800 nm from the captured image to produce an extract image; a conversion means which replaces the extract image with the captured image; a means which produces extract images of candidate regions using a given threshold value; a means which synthesizes the extract images of a plurality of candidate regions; and a means which converts shape features of extracted regions into numerical values to obtain a group of numerals regarding the image information elements. The term "image information element" means a characteristic amount of image in an image of floc regions or aqueous-phase suspended matter, and examples thereof include hue, lightness, saturation, number of pixels, chromaticity, and brightness. One or more image information elements from these are extracted to produce an extract image, followed by converting into a processed image. Furthermore, a threshold value is set for each of one or more image information elements, extract images of a plurality of candidate regions are synthesized to assess threshold values, and the results thus obtained are processed by a logical operation. Thus, shape features of the extracted regions are converted to numerical values to obtain a group of numerals regarding another image information element.

The images produced, in particular, with components having a wavelength of 500-800 nm may also be obtained, for example, in the following manner. The object to be imaged is subjected to a phase-contrast examination using a light source having a wide output wavelength range, represented, for example, by a halogen light source, and the captured images are processed so that components having a wavelength of 500-800 nm are extracted in the stage of image processing.

Figure 3:
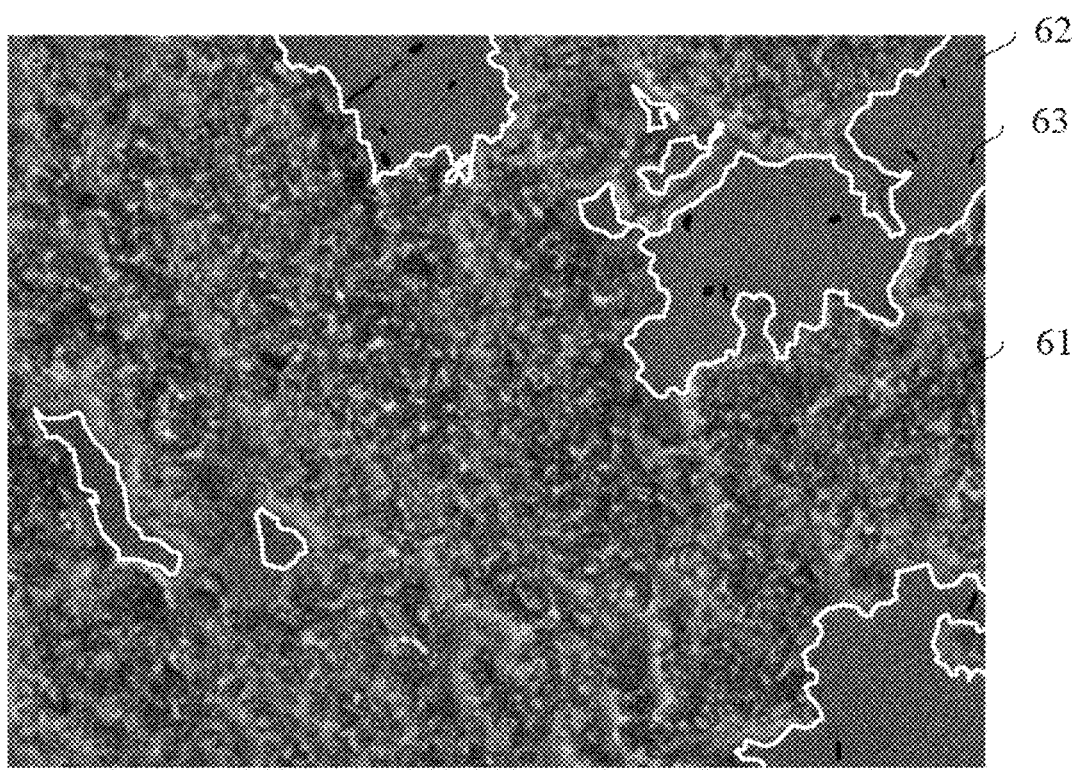
FIG. 3 is a captured image showing an embodiment of image processing according to the present invention.

In FIG. 3 is shown an example of an extract image according to this embodiment. In cases when activated sludge collected from a membrane separation activated-sludge tank is subjected to a phase-contrast examination with a microscope, it is observed so as to have the following brightness and tint due to a relationship between the refractive index and thickness of the constituent elements. Activated sludge is roughly divided into a solid phase including flocs and microorganisms and an aqueous phase which is non-floc regions.

Although brightness and tint cannot be unconditionally described, the floc regions 61 generally are higher in brightness and saturation than the aqueous phase and have a white tint or a red, yellow, black, or brown tint, although they vary depending on the constituent components and the state.

The aqueous-phase regions 62, which are non-floc regions, are imaged as a background with medium brightness, and have a gray tint and low saturation. Filamentous bacteria and microscopic animals, for example, often give images having medium to low brightness, a blue tint, and medium saturation.

Extraction of floc regions 61 per unit field of view is not particularly limited. However, a preferred method includes converting a captured image into an HSV space constituted of three kinds of components, i.e., hue, saturation, and lightness, extracting S (saturation) components as one of the bands to display the saturation components while converting the saturation into the brightness of pixels of the display device, and thereby obtaining an image while utilizing information on the S (saturation) components of the HSV image. As a result, the image has a high contrast relative to the aqueous-phase regions 62, which are non-floc regions, and is hence binarized with respect to the degree of saturation to perform discrimination. Another preferred method includes taking an image by RGB (red, green, blue) color imaging, resolving the image into R, G, and B information pieces, determining a brightness profile for each components, and obtaining an image of R only or of G only or obtaining an image by synthesizing R and G. Binarization concerning brightness information or information on another kind of components or binarization by another method may be performed.

A threshold value is set at will while viewing an image of activated sludge which has been taken and a brightness distribution thereof, and this threshold value is used to produce a binarized image. The images of before and after the processing are compared and in cases when there is a positional shift therebetween, the threshold value is changed. This operation is repeated to set an appropriate threshold value. Use may be made of a method in which a captured image is processed with any of various image processing filters and a threshold value is set on the results thus obtained. For example, a captured image may be binarized by setting a threshold value on the results of edge extraction processing, represented by a laplacian filter, and comparing the threshold value in magnitude with the resultant values of sharpening performed for each of the pixels of the captured image. Furthermore, the binarized image may be subjected, for example, to expansion processing or contraction processing or a combination of both to thereby remove noise components from the image.

It is also preferable that image information is processed by a logical operation to thereby obtain information on desired regions with high accuracy. For example, a total area ratio may be determined from the proportion of floc regions in the total area of the image in unit filed of view. The circumference length of each floc region may be divided by the area to determine the circularity and thereby distinguish the floc regions from foreign matter. These calculations may be manually made in any way or may be automatically made using a preset calculating software.

In this embodiment, the image processing means 42 divides a captured image per unit filed of view into regions (floc regions 61) where flocs have been formed and non-floc regions (aqueous-phase regions 62) as the other regions, as shown in FIG. 3, performs binarization to acquire image information elements as image information on at least one region of the floc regions and the aqueous-phase regions, and uses the image information elements to determine a control parameter through a calculation satisfying at least any one of the following requirements.

(a) The control parameter is calculated from an image information element determined separately for the floc regions or the aqueous-phase regions.

(b) At least two control parameters calculated from an image information element determined separately for the floc regions or the aqueous-phase regions are combined for each kind of regions.
(c) At least two image information elements determined separately for the floc regions or the aqueous-phase regions are combined to calculate the control parameter.
(d) At least two of the values calculated in (a) to (c) are combined to calculate the control parameter.

Examples of the control parameter include area, circumference length, region-to-region distance, areal ratio, number, brightness, chromaticity, and saturation. Examples of the region-to-region distance include the distance between the centers of gravity of regions in flocs and the distance between the nearest portions of two regions. The present invention is further characterized in that information element(s) are used to perform a calculation satisfying at least one of the requirements (a) to (d) and to calculate another control parameter. The control parameters are not particularly limited, and examples thereof include the following.
(i) Total area of floc regions and/or total area of aqueous-phase regions
(ii) Total-area ratio between floc regions and aqueous-phase regions
(iii) Number of floc regions and/or aqueous-phase regions
(iv) Brightness of floc regions and/or aqueous-phase regions
(v) Circumference length of floc regions and/or aqueous-phase regions
(vi) Area of floc regions each having an area not larger than a certain value and surrounded by an aqueous-phase region and/or areal ratio thereof to aqueous-phase regions or floc regions
(vii) Area of aqueous-phase regions each having an area not larger than a certain value and surrounded by a floc region and/or areal ratio thereof to floc regions or aqueous-phase regions
(viii) Area of floc regions each having a color tone or a brightness not higher than a certain value and/or areal ratio thereof to aqueous regions or floc regions
(ix) Area of aqueous-phase regions each having a color tone or a brightness not higher than a certain value and/or areal ratio thereof to floc regions or aqueous-phase regions Specifically, as (iv) the brightness of floc regions and/or aqueous-phase regions, it is preferred to use (a) the brightness which is an image information element determined separately for floc regions and/or aqueous-phase regions.

(i) The total area of floc regions and/or total area of aqueous-phase regions, (iii) the number of floc regions and/or aqueous-phase regions, and (v) the circumference length of floc regions are preferably calculated using, for each kind of regions, (b) a combination of at least two control parameters calculated from image information elements determined separately for the floc regions or the aqueous-phase regions.

(ii) The total-area ratio between floc regions and aqueous-phase regions is preferably calculated using (c) a combination of at least two values of total area determined separately for the floc regions or the aqueous-phase regions. Here, the calculation is performed by being included in the area of floc regions each surrounded by an aqueous-phase region. In this embodiment, in cases when, for example, "a ratio of the total area of floc regions each having an area not larger than a certain value and surrounded by an aqueous-phase region is used", use may be made of any amount which correlates with the proportion of the area of the floc regions each having an area not larger than a certain value to the area of the aqueous-phase regions, such as, for example, the ratio of the area of the floc regions each having an area not larger than a certain value to the area of the aqueous-phase regions or a ratio determined from the area of the aqueous-phase regions which includes the area of floc regions each surrounded by an aqueous-phase region. In calculating a ratio, the proportion of each kind of regions may be calculated using not only the area of the regions but also the number of the regions, the average or total brightness of each kind of regions, etc.

(vi) The area of floc regions each having an area not larger than a certain value and surrounded by an aqueous-phase region and/or the areal ratio thereof to aqueous-phase regions or floc regions, (vii) the area of aqueous-phase regions each having an area not larger than a certain value and surrounded by a floc region and/or the areal ratio thereof to floc regions or aqueous-phase regions, (viii) the area of floc regions each having a color tone or a brightness not higher than a certain value and/or the areal ratio thereof to aqueous regions or floc regions, and (ix) the area of aqueous-phase regions each having a color tone or a brightness not higher than a certain value and/or the areal ratio thereof to floc regions or aqueous-phase regions are preferably calculated using (d) a combination of at least two of the values calculated in (a) to (c) and assortment is preferably conducted in accordance with arbitrarily set threshold values.

Examples of methods for calculating (vi) the area of floc regions each having an area not larger than a certain value and surrounded by an aqueous-phase region and/or the areal ratio thereof to aqueous-phase regions or floc regions include a method which specifically includes: distinguishing aqueous-phase regions and floc regions from each other, subsequently distinguishing floc regions each having an area not larger than a certain value and surrounded by an aqueous-phase region, finally calculating the total area of the aqueous-phase regions and the floc regions each having an area not larger than a certain value and surrounded by an aqueous-phase region, and calculating the proportion of the area of the floc regions each having an area not larger than a certain value and surrounded by an aqueous-phase region to the area of the aqueous-phase regions. In calculating an areal ratio of floc regions, the total area of floc regions each having an area not larger than a certain value and surrounded by an aqueous-phase region may or may not be included in the area of aqueous-phase regions or may or may not be included in the area of floc regions, as a denominator. With respect to the area of floc regions each having an area not larger than a certain value and surrounded by an aqueous-phase region and/or the area of aqueous-phase regions, the areas of the respective kinds of regions calculated in the manner shown above may be used as such.

Examples of methods for calculating (vii) the area of aqueous-phase regions each having an area not larger than a certain value and surrounded by a floc region and/or the areal ratio thereof to floc regions or aqueous-phase regions include, as in the case of (vi), a method which includes: distinguishing aqueous-phase regions and floc regions from each other, subsequently distinguishing aqueous-phase regions each having an area not larger than a certain value and surrounded by a floc region, finally calculating the total area of the floc regions and the aqueous-phase regions each having an area not larger than a certain value and surrounded by a floc region, and calculating the proportion of the area of the aqueous-phase regions each having an area not larger than a certain value and surrounded by a floc region to the area of the floc regions. With respect to (viii) and (ix) also, calculations may be performed using information on brightness or color tone in place of area, in the same manner as for (vi) and (vii).

Table 1 shows examples of: control parameters obtained from image information elements including (i) to (ix) shown above; the state of activated sludge to be assessed; and wastewater treatment conditions to be controlled in accordance with assessment results. Table 2 shows examples of the results obtained by processing images of membrane separation activated sludge from textile industry wastewater.

TABLE 1

| | Control parameters obtained from image information elements | State of activated sludge to be assessed | Wastewater treatment conditions to be controlled |
|---|---|---|---|
| Floc regions | Total area<br>Approximate total area obtained by multiplying approximate area of each region calculated from circumference length by the number of regions<br>Area obtained by subtracting approximate total area calculated from region-to-region distance, from unit area of a field of view | Activated-sludge amount (total amount) | (A) Concentration of inflow water to be treated and inflow rate<br>(B) Filtration rate<br>(E) Nutrient salt addition amount<br>(F) Chemical addition amount<br>(G) Amount of activated sludge<br>(H) Treated-water return rate<br>(I) Operating conditions for pretreatment step<br>(K) Temperature regulation conditions for activated-sludge tank<br>(L) Operating conditions for membrane elements |
| | Change amount in circumference length with lapse of time<br>Change amount in region-to-region distance with lapse of time<br>Change amount in the numberof regions with the lapse of time | State of activated sludge (shape, degree of dispersion) | (A) Concentration of inflow water to be treated and inflow rate<br>(B) Filtration rate<br>(C) Filtration period or filtration suspension period<br>(D) Aeration-air feed rate or aeration period |
| | Change amount in any of total, maximum, minimum, average, median, and deviation values of brightness with lapse of time<br>Change amount in brightness distribution with lapse of time<br>Proportion of low-brightness regions and change amount therein with lapse of time<br>Change amount in chromaticity with lapse of time<br>Change amount in saturation with lapse of time | Change in quality of activated sludge (tint, viscosity, biota, microscopic-animal action amount, dissolved oxygen concentration) | (E) Nutrient salt addition amount<br>(F) Chemical addition amount<br>(G) Amount of activated sludge<br>(H) Treated-water return rate<br>(I) Operating conditions for pretreatment step<br>(J) Operating conditions for post-treatment step<br>(K) Temperature regulation conditions for activated-sludge tank<br>(L) Operating conditions for membrane elements<br>(M) Cleaning conditions for membrane elements<br>(N) Cleaning conditions for aeration tubes |
| Aqueous-phase regions | Area obtained by subtracting total area from unit area of a field of view<br>Area obtained by subtracting approximate total area obtained by multiplying approximate area of each region calculated from circumference length by the number of regions, from unit area of a field of view<br>Approximate total area calculated from region-to-region distance | Activated-sludge amount (total amount) | (A) Concentration of inflow water to be treated and inflow rate<br>(B) Filtration rate<br>(E) Nutrient salt addition amount<br>(F) Chemical addition amount<br>(G) Amount of activated sludge<br>(H) Treated-water return rate |

TABLE 1-continued

| | Control parameters obtained from image information elements | State of activated sludge to be assessed | Wastewater treatment conditions to be controlled |
|---|---|---|---|
| | | | (I) Operating conditions for pretreatment step<br>(K) Temperature regulation conditions for activated-sludge tank<br>(L) Operating conditions for membrane elements |
| Both floc regions and aqueous-phase regions | Areal ratio between floc regions and aqueous-phase | | |
| | Ratio of total area of floc regions not larger than certain area and present in aqueous-phase region | Aqueous-phase suspended matter amount (total amount) | (A) Concentration of inflow water to be treated and inflow rate<br>(B) Filtration rate<br>(C) Filtration period or filtration suspension period<br>(D) Aeration-air feed rate or aeration period<br>(E) Nutrient salt addition amount<br>(F) Chemical addition amount<br>(G) Amount of activated sludge<br>(H) Treated-water return rate<br>(I) Operating conditions for pretreatment step<br>(J) Operating conditions for post-treatment step<br>(K) Temperature regulation conditions for activated-sludge tank<br>(L) Operating conditions for membrane elements<br>(M) Cleaning conditions for membrane elements<br>(N) Cleaning conditions for aeration tubes |
| | Change amount in circumference length of floc regions not larger than certain area and present in aqueous-phase region, with lapse of time | State of aqueous-phase suspended matter, (shape, degree of dispersion) | |
| | Change amount in region-to-region distance of floc regions not larger than certain area and present in aqueous-phase region, with lapse of time | | |
| | Change amount in the number of floc regions not larger than certain area and present in aqueous-phase region, with lapse of time | | |
| | Change amount in any of total, maximum, minimum, average, median, and deviation values of brightness of floc regions not larger than certain area and present in aqueous-phase region, with lapse of time | Quality of aqueous-phase suspended matter (tint, viscosity, biota, microscopic-animal action amount, dissolved oxygen concentration) | |
| | Change amount in brightness distribution of floc regions not larger than certain area and present in aqueous-phase region, with lapse of time | | |
| | Change amount in proportion of low-brightness floc regions not larger than certain area and present in aqueous-phase region, with lapse of time | | |
| | Change amount in chromaticity of floc regions not larger than certain area and present in aqueous-phase region, with lapse of time | | |
| | Change amount in saturation of floc regions not larger than certain area and present in aqueous-phase region, with lapse of time | | |

TABLE 2

| Control parameter | (i) Total area of floc regions | (i) Total area of aqueous-phase regions | (ii) Areal ratio of floc regions | (iii) Number of floc regions | (iv) Average brightness of floc regions | (iv) Average brightness of aqueous-phase regions |
|---|---|---|---|---|---|---|
| Sludge image No. 1 | 1.07 | 0.656 | 0.620 | 371 | 124.3 | 75.9 |
| Sludge image No. 2 | 1.03 | 0.696 | 0.597 | 253 | 113.7 | 78.0 |
| Sludge image No. 3 | 1.21 | 0.514 | 0.703 | 153 | 122.9 | 77.7 |
| Sludge image No. 4 | 1.09 | 0.635 | 0.632 | 181 | 120.4 | 77.5 |
| Sludge image No. 5 | 1.15 | 0.582 | 0.663 | 213 | 103.3 | 79.7 |
| Sludge image No. 6 | 1.10 | 0.623 | 0.639 | 373 | 97.9 | 78.3 |
| Sludge image No. 7 | 1.07 | 0.662 | 0.617 | 648 | 97.5 | 77.1 |
| Sludge image No. 8 | 1.10 | 0.627 | 0.637 | 158 | 100.3 | 79.1 |
| Sludge image No. 9 | 1.10 | 0.632 | 0.634 | 451 | 101.5 | 78.3 |
| Sludge image No. 10 | 1.09 | 0.636 | 0.632 | 344 | 98.2 | 77.0 |
| Average | 1.10 | 0.626 | 0.637 | 315 | 108.0 | 77.9 |

| Control parameter | (v) Circumference length of floc regions | (vi) Area of floc regions not larger than certain area and surrounded by aqueous-phase region | (viii) Total area of low-brightness floc regions | (viii) Areal ratio of low-brightness floc regions |
|---|---|---|---|---|
| Sludge image No. 1 | 59.4 | 0.001 | 0.003 | 0.003 |
| Sludge image No. 2 | 109.4 | 0.002 | 0.001 | 0.001 |
| Sludge image No. 3 | 82.3 | 0.001 | 0.000 | 0.000 |
| Sludge image No. 4 | 89.9 | 0.014 | 0.000 | 0.000 |
| Sludge image No. 5 | 92.9 | 0.008 | 0.003 | 0.002 |
| Sludge image No. 6 | 83.4 | 0.016 | 0.058 | 0.052 |
| Sludge image No. 7 | 69.5 | 0.002 | 0.271 | 0.254 |
| Sludge image No. 8 | 87.7 | 0.014 | 0.056 | 0.051 |
| Sludge image No. 9 | 109.9 | 0.003 | 0.045 | 0.041 |
| Sludge image No. 10 | 113.1 | 0.027 | 0.039 | 0.035 |
| Average | 89.8 | 0.009 | 0.048 | 0.043 |

With respect to the total area of floc regions and the total area of aqueous-phase regions, which represent (i), and the total area of low-brightness floc regions, which is an example of (viii), the following may be calculated besides the total areas although not shown in Table 2: a maximum area which indicates the area of a maximum floc region or a maximum aqueous-phase region; a minimum area which indicates the area of a minimum floc region or a minimum aqueous-phase region; the average area in each region of floc or aqueous-phase regions; and a standard deviation of the area of floc or aqueous-phase regions. With respect to the average brightness of floc regions and the average brightness of aqueous-phase regions, which are examples of (iv), any of the following may be calculated: brightness for each of R, G, and B (red, green, and blue), maximum brightness, minimum brightness, and brightness deviation. With respect to the circumference length of floc regions, which is an example of (v), any of the following may be calculated: maximum circumference length, minimum circumference length, average circumference length, and circumference length deviation. In activated sludge in a deteriorated state, there are case where a transparent viscous substance has grown around flocs to make the flocs difficult to distinguish from aqueous-phase regions in an image taken with an optical means 41. In such cases, focusing is conducted by regulating the distance between the lens of the optical means 41 and the activated sludge. Use may be made of a method in which: this operation of focusing itself is converted to a numerical value, specifically, the height of the lens or a change in focal number is used as a control parameter; an assessment means (assessment unit) 48 deems the cases when the parameter is outside a preset control reference range to be abnormal; and it is output by an alarm output means (alarm output part) 49.

According to this embodiment, it is possible to instantly determine a calculated value and/or a change amount in the calculated value with the lapse of time with respect to at least any of area, circumference length, number, and region-to-region distance which are control parameters obtained from image information on at least either region of floc regions and aqueous-phase regions. Because of this, the state of the activated sludge can be kept suitable for the membrane filtration by increasing the frequency of examining the membrane separation activated-sludge tank in continuous operation to monitor change amounts with the lapse of time and properly controlling the suitable wastewater treatment conditions before being outside a control range. It is hence possible to stably perform a membrane filtration operation over a prolonged period before an increase in membrane filtration pressure occurs.

In a membrane separation activated-sludge method, in cases when the operation conditions are improper or unstable (for example, due to fluctuations in raw-water quality or fluctuations in temperature thereof or after chemical cleaning of the membranes), the activated sludge is prone to be in a deteriorated state. This activated sludge has an increased aqueous-phase suspended matter amount. In cases when the aqueous-phase suspended matter is large in amount, when being filtered with membranes, it is prone to adhere to or accumulate on the surfaces of the membranes or in the pores thereof to clog the membranes. Evaluation of floc regions only is hence insufficient for assessing whether the state of the activated sludge is satisfactory or not in order to stably perform a membrane filtration operation in a membrane separation activated-sludge method. It is necessary to evaluate the aqueous-phase suspended matter amount and to monitor a tendency thereof to rise.

Hitherto, in order to evaluate aqueous-phase suspended matter, a worker has collected activated sludge at the site, then subjected the activated sludge to solid-liquid separation by centrifuging or with quantitative filter paper, and measured the turbidity or TOC (total organic carbon) of the resultant aqueous phase. According to this embodiment, however, monitoring of the aqueous-phase suspended matter amount is rendered possible by calculating the area of flocs present in aqueous regions and each having an area not larger than a certain value, in an image of the activated sludge, without conducting the measurement of the turbidity or TOC (total organic carbon) of the aqueous phase obtained through solid-liquid separation by centrifuging or with quantitative filter paper. Even in cases when the activated-sludge amount varies, in which the area of aqueous-phase regions varies, a comparison is rendered possible by calculating the ratio of the area of floc regions each having an area not larger than a certain value and surrounded by an aqueous-phase region to the area of aqueous-phase regions. Specifically, activated sludge is collected from a membrane separation activated-sludge tank, an image thereof is taken with an optical means, and the captured image is processed, followed by comparing, for example, (vi) the area of floc regions each having an area not larger than a certain value and surrounded by an aqueous-phase region and/or the areal ratio thereof to aqueous-phase regions or floc regions, with a preset control reference range to assess the state of the activated sludge. Thus, an alarm and/or control for making the operating conditions proper can be output before the sludge in the membrane separation activated-sludge method comes into a deteriorated state to start to elevate the membrane filtration pressure. In addition, the monitoring and control are possible even from a remote place using a communication appliance.

According to this embodiment, after an image of the activated sludge collected from a membrane separation activated-sludge tank is taken with an optical means, (i) the total area of floc regions is calculated in the captured image, thereby obtaining, on a real-time basis, information comparable with the mixed liquor suspended solid concentration (MLSS) measured by the methods for measuring mixed liquor suspended solid concentration described above (solid-liquid separation with glass-fiber filter paper is performed, the resultant residual solid is dried by heating at 105-110° C. for about 2 hours, and the mass thereof is used for the calculation). This method is hence preferred. In cases when an image of activated sludge is taken in a conventional sedimentation method, the area of aqueous-phase regions in the captured image is larger than the area of floc regions because the actual amount of activated sludge is smaller than in the membrane separation activated-sludge method, and there are even cases where the captured image contains no floc regions, making it impossible to obtain a correlation between the total area of floc regions and the actual amount of activated sludge. In contrast, in the membrane separation activated-sludge method, since the actual amount of activated sludge is large, it is highly probable that a captured image contains both floc regions and aqueous-phase regions and it is easy to obtain a correlation between the total area of floc regions in a captured image and the actual amount of activated sludge.

Furthermore, it has hitherto been necessary that the activated-sludge amount and the aqueous-phase suspended matter amount be separately measured using respective measuring techniques. According to this embodiment, however, an image of activated sludge collected from a membrane separation activated-sludge tank is taken with an optical means and the captured image is thereafter processed, making it possible to calculate and assess the both. Consequently, rapid and proper operation control is possible even from a remote place.

Table 2 indicates that a plurality of images were taken and processed, in order to take images of the same activated sludge with respect to ten fields of view, calculate control parameters for each of the images and average the parameters to determine control parameters of the activated sludge. Since image processing of an image result of the same activated sludge taken in one field of view may result in an error, it is preferable that averages of the results of images taken in a plurality of fields of view are used as the results of the image processing. By using examination-region images as many as possible to make an assessment, the accuracy of assessment improves. From the standpoint of obtaining a large number of examination-region images, it is preferable that the examination jig 44 and liquid-sending means 75 which will be described later are used to replace the activated sludge and automatically increase the number of examination fields of view.

Moreover, the area or number of specific floc regions which have a shortage in oxygen supply within the floc regions and have come into an anaerobic state to have a low brightness, or the number of filamentous bacteria or microscopic animals, etc., may be converted into a numerical value, for example, by subjecting floc regions having a color tone or a brightness not higher than a certain value to shape assessment processing, such as pattern matching, or masking. Furthermore, in the case of measuring, for example, the amount in which microscopic animals have moved, use can be made of a method in which: a plurality of images of phase-contrast images or bright-field images or of both are taken at a time interval; these images taken at the time interval are subjected to subtraction processing; any region which has a difference in the results thereof is deemed to have contained microscopic animals (undergone replacement); and the amount in which the microscopic animals have moved is determined by measuring the distance or time. The unit time period may be regulated by changing the image acquisition interval or calculation interval for continuously acquired images. It is also possible to follow microscopic animals by memorizing the size or a feature thereof.

In this embodiment, imaging may be conducted while deliberately changing the thickness of the activated sludge to thereby change the shape of the region in the thickness direction so that the density of the activated sludge, the degree of aggregation thereof, constituent components, etc. are quantitatively evaluated in accordance with a difference in floc region between images of before and after the thickness change. The change in thickness direction may be conducted in multiple stages. Images in the respective stages may be synthesized in image processing, thereby making it possible to evaluate the shape of the activated sludge not only two-dimensionally but also three-dimensionally.

Furthermore, by deliberately changing the thickness of the activated sludge, the amount of aqueous-phase suspended matter which was unable to be recognized in image processing for one-stage thickness because it overlapped with a floc region of the activated sludge can be measured. This method improves the accuracy and is hence preferred.

In cases when the amount of activated sludge is too large and it is difficult to take an image thereof as such, the activated sludge may be diluted before being imaged. However, from the standpoint of preventing the activated sludge from being changed in aggregated state by a change in osmotic pressure due to the dilution, it is preferred to perform dilution, for example, with the membrane filtrate water which was obtained when the activated sludge to be imaged was collected or with an aqueous sodium chloride solution prepared so as to have a similar salt concentration, to equalize the osmotic pressure.

Use may be made of a method in which: water obtained by centrifuging activated sludge is imaged to thereby obtain an image of an aqueous-phase region only, or filtrate water obtained by the membrane filtration is imaged and a difference with the aqueous-phase region obtained by centrifuging is converted into a numerical value, thereby monitoring the amount of aqueous-phase suspended matter which is apt to be trapped by the membranes in the membrane filtration.

There may be cases where air bubbles come into the activated sludge or where the activated sludge collected from an activated-sludge tank undergoes sedimentation separation before imaging to become more uneven than just after the collection from the activated-sludge tank. From the standpoint of avoiding such troubles, degassing or stirring may be performed before being imaged.

In this embodiment, the results of the evaluation are used to determine the state of the membrane separation activated sludge and control the wastewater treatment conditions in order to inhibit an increase in membrane filtration pressure, a deterioration in filtrate water quality, etc. At least any of the followings is the controlled object.

Figure 4:
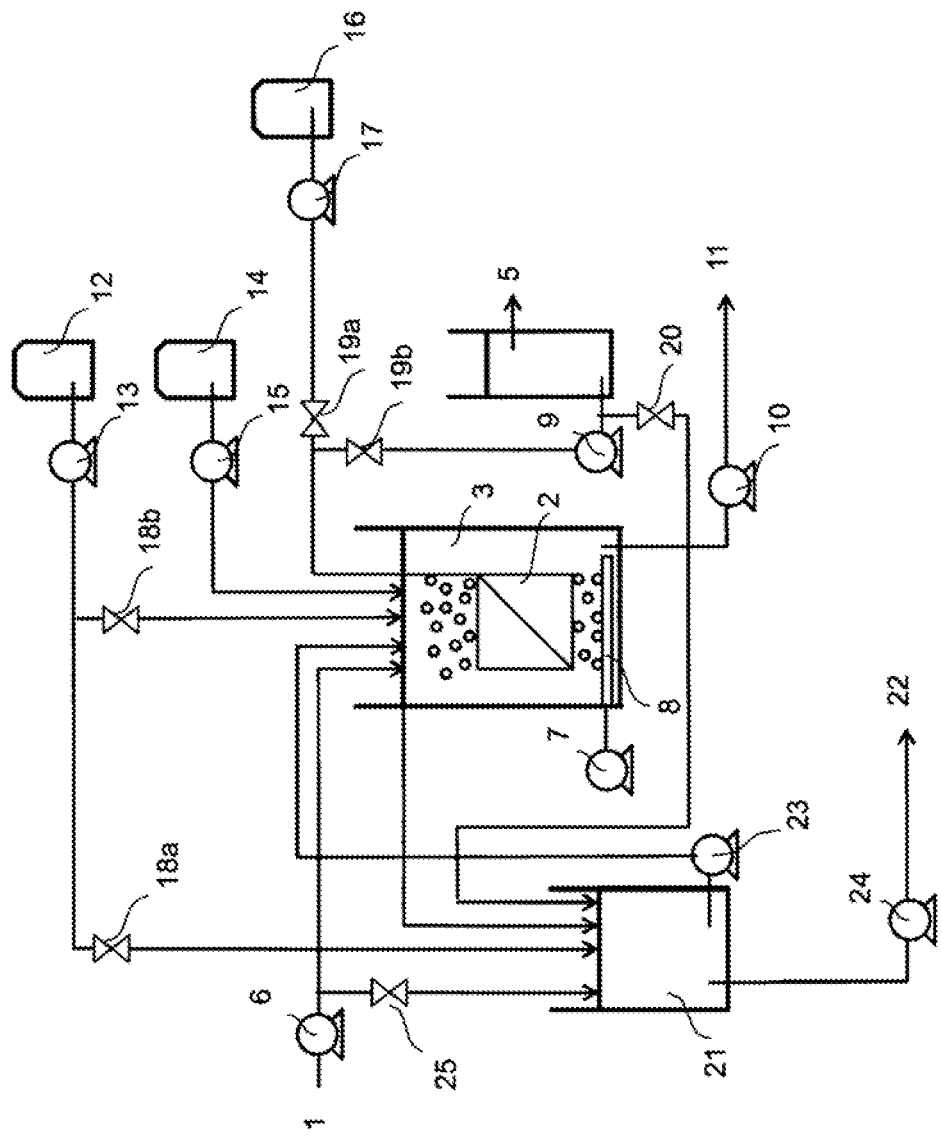
FIG. 4 is an example illustrating a wastewater treatment flow in a membrane separation activated-sludge method according to the present invention.

(A) concentration of inflow water to be treated and inflow rate
(B) filtration rate
(C) filtration period or filtration suspension period
(D) aeration-air feed rate or aeration period
(E) nutrient salt addition amount
(F) chemical addition amount
(G) amount of activated sludge
(H) treated-water return rate
(I) operating conditions for pretreatment step
(J) operating conditions for post-treatment step
(K) temperature regulation conditions for activated-sludge tank
(L) operating conditions for membrane elements
(M) cleaning conditions for membrane elements
(N) cleaning conditions for aeration tubes FIG. 4 illustrates an embodiment of the present invention. An image of activated sludge is taken with an optical means 41 and a camera 43 and processed by an image processing means 42 to assess (i) the total area of floc regions, (vii) the area of aqueous-phase regions each having an area not larger than a certain value and surrounded by a floc region and/or the areal ratio thereof to floc regions or aqueous-phase regions, etc. In cases when the result is outside a preset control range, an alarm is output by an alarm output means 49 and, for example, (G) the amount of activated sludge is controlled accordingly. Thus, it is possible to inhibit the membrane filtration pressure from increasing and the filtrate water quality from deteriorating.

The alarm to be output by the alarm output means 49 is a notice showing that a control parameter is outside a control range. There is, for example, the function of displaying characters on a screen of the control panel of a device. In accordance with criticality, the mode of display may be changed or a sound may be used. The alarm may be received in a remote place using a communication appliance.

In order to heighten the accuracy of assessment result, an alarm may be output by the alarm output means 49 in cases when both (i) and (vii) have become outside the respective control ranges. Furthermore, the alarm output means 49 may be set so that display of alarm output is provided stepwise and when either (i) or (vii) only is outside the control range, a mere notice is displayed and when both (i) and (vii) have become outside the respective control ranges, need of control is displayed.

The state of activated sludge is affected and changed by the quality of the water to be treated and the operating conditions for the membrane separation activated-sludge process and for a treatment process upstream therefrom. For accurately grasping the state of the activated sludge, it is necessary to continuously or periodically collect activated sludge from the membrane separation activated-sludge tank, take an image thereof with the optical means 41 and camera 43, and process the image by the image processing means 42. An activated-sludge visualizer 52 according to the present invention hence includes a suction pump 47 for collecting activated sludge from a membrane separation activated-sludge tank 3. It is preferable that activated sludge is continuously or periodically collected, in accordance with signals from an activated-sludge visualization control part 51, to visualize the state of the activated sludge. The term "periodically" herein means, for example, once a day at a preset time or once in every three hours.

Examples of control using parameters obtained from image information are shown below.

In a biotreatment in a membrane separation activated-sludge tank, it is important, for stabilizing the biotreatment, to constantly maintain a balance between the amount of organic substances contained in the inflow wastewater 1 and the amount of the activated sludge in the membrane separation activated-sludge tank 3 for degrading the organic substances. As the amount of organic substances, use is made of ones indicated by any of BOD (biological oxygen demand), COD (chemical oxygen demand), and TOC (total organic carbon), which are general indexes to water quality. A load per unit activated-sludge amount, e.g., BOD/MLSS load, is calculated and controlled so as to be about 0.05-0.2 kg-BOD/kg-MLSS per day, more preferably about 0.07-0.15 kg-BOD/kg-MLSS per day. According to this embodiment, (vi) the area of floc regions each having an area not larger than a certain value and surrounded by an aqueous-phase region and/or the areal ratio thereof to aqueous-phase regions or floc regions is monitored, and in cases when the area or areal ratio of the floc regions exceeds a control range, this activated sludge is deemed to have an increased aqueous-phase suspended matter amount and be in a deteriorated state, and a message is displayed as an alarm such as, for example, "check whether BOD/MLSS load is within control range". In accordance with the displayed content, check is performed regarding whether, for example, (A) the BOD concentration of the wastewater 1, which is water to be treated, or the inflow rate thereof or (G) the amount of the activated sludge is within a proper range and, in cases when (A) or (G) exceeds the control range, it is controlled to become within the range.

For monitoring an increase in the aqueous-phase suspended matter amount in the activated sludge, use may be made of (ix) the area of aqueous-phase regions each having a color tone or a brightness not higher than a certain value and/or the areal ratio thereof to floc regions or aqueous-phase regions, besides (vi) the area of floc regions each having an area not larger than a certain value and surrounded by an aqueous-phase region and/or the areal ratio thereof to aqueous-phase regions or floc regions. Both (vi) and (ix) may be used in order to heighten the accuracy of assessment.

A general control range for the amount of activated sludge in the membrane separation activated-sludge method is 3,000-25,000 mg/L, more preferably about 7,000-18,000 mg/L. In cases when (i) the total area of floc regions exceeds a control range, it is deemed that the activated-sludge amount has increased and (G) the amount of the activated sludge may be regulated by withdrawing the activated sludge so that it becomes within the range.

Furthermore, (G) the activated-sludge amount in the membrane separation activated-sludge tank 3 may be regulated by supplying from an auxiliary tank 21 using an auxiliary-tank liquid-sending pump 23, in order to regulate a BOD/MLSS load. Moreover, for the purpose of improving the state of the activated sludge within the membrane separation activated-sludge tank 3, use may be made of a method in which seed sludge that has been acclimatized using the auxiliary tank 21, in (I) a pretreatment step, is sent to the membrane separation activated-sludge tank 3 to replenish the activated sludge, in accordance with HRT (hydraulic residence time), which indicates the time period during which wastewater resides in the membrane separation activated-sludge tank, or SRT (solid residence time), which indicates the time period required for the activated sludge within the membrane separation activated-sludge tank to be entirely replaced by newly yielded activated sludge. In the case of using the auxiliary tank 21 as a denitrification tank, it is preferable, for example, that the auxiliary-tank liquid-sending pump 23 is used to circulate the activated sludge and replace some of the activated sludge.

In accordance with system configurations, the following measures may be taken in order to regulate the area of working membranes: some of the membrane elements immersed in the membrane separation activated-sludge tank 3 are temporarily sealed, or in cases when a plurality of membrane elements have been disposed in rows and each row is equipped with a suction pump 9, the suction pumps 9 of some of the rows are regulated in their flow rate or stopped. Thus, not only (B) the filtration rate is regulated to control (L) the operating conditions for the membrane elements and thereby changing the membrane filtration flux, which indicates filtration rate per unit membrane area, but also (A) the concentration of inflow water to be treated and the inflow rate thereof are regulated to regulate the BOD/MLSS load.

Furthermore, although not shown in the drawing, filtrate water 5 may be temporarily returned from the filtrate water tank 4 to the membrane separation activated-sludge tank 3 to increase or reduce (H) the treated-water return rate, thereby regulating (A) the concentration of inflow water to be treated and the inflow rate thereof to make the BOD/MLSS load suitable.

In cases when a temperature regulation function is included for maintaining biotreatment activity, although not shown in the drawing, it is preferred to control (K) the temperature regulation conditions for the activated-sludge tank by, for example, displaying, as an alarm, "check temperature regulation conditions" and regulating the set temperature. For example, in a case where the internal temperature of the activated-sludge tank has declined or rose and is outside a temperature range optimal for the microorganisms in the activated-sludge to biologically degrade organic substances contained in the inflow water, the microorganisms are prone to be reduced in biodegradation ability. These microorganisms are prone to perform self-defense function to produce metabolites or die, resulting in an increase in aqueous-phase suspended matter amount. Consequently, by heightening or lowering the temperature of the activated-sludge tank to a value within the optimal temperature range, the microorganisms can be made to retain the biodegradation ability and the system can be stably operated without increasing the aqueous-phase suspended matter amount. For the biotreatment, not only organic substances but also minor ingredients such as nitrogen and phosphorus are necessary. In the case where (E) the amount of a nutrient salt added from a nutrient salt addition tank 12 illustrated in FIG. 4 is being additionally regulated, the wastewater 1 which is water to be treated may change in quality and temporarily have a shortage in minor ingredients such as nitrogen and phosphorus and this may deteriorate the state of the sludge to disperse the flocs or increase the aqueous-phase suspended matter amount. The method may hence be configured so that (vi) the area of floc regions each having an area not larger than a certain value and surrounded by an aqueous-phase region and/or the areal ratio thereof to aqueous-phase regions or floc regions is monitored and, in cases when the area or areal ratio of the floc regions exceeds a control range, the activated sludge is deemed to have an increased aqueous-phase suspended matter amount and be in a deteriorated state and an alarm requiring to additionally regulate (E) the amount of a nutrient salt added from the nutrient salt addition tank 12 illustrated in FIG. 4 is output.

In the case of additionally performing addition of a new chemical, a preferred method for determining the amount of the chemical to be added is as follows. The activated sludge in the membrane separation activated-sludge tank 3 is examined for (vi) the area of floc regions each having an area not larger than a certain value and surrounded by an aqueous-phase region and/or the areal ratio thereof to aqueous-phase regions or floc regions, before and after addition of the chemical, and in accordance with the change amount therein, (F) the amount of the chemical to be added is determined.

There are also cases where the pH of the activated sludge in the membrane separation activated-sludge tank 3 fluctuates and becomes an acidic or alkaline, because of fluctuations in the water quality of the wastewater 1 or in the course of biotreatment reactions by the activated sludge within the membrane separation activated-sludge tank 3. The method may hence be configured so that in cases when (vi) the area of floc regions each having an area not larger than a certain value and surrounded by an aqueous-phase region and/or the areal ratio thereof to aqueous-phase regions or floc regions exceeds a control range, then this activated sludge is deemed to have an increased aqueous-phase suspended matter amount and be in a deteriorated state and an alarm indicating "check pH" is output. Furthermore, using alarm outputting and a control device which is associated with a pH meter of a chemical addition tank 14 shown in FIG. 4, control may be performed so that in cases when the pH of the activated sludge in the membrane separation activated-sludge tank 3 has fluctuated and become an acidic or alkaline, an acid (e.g., hydrochloric acid or sulfuric acid) or alkali (e.g., sodium hydroxide) for neutralization is added from the chemical addition tank 14 shown in FIG. 4 in order to regulate (F) the amount of the chemical to be added. A selection of the details of alarm to be output when the result of (vi) exceeds a control range may be in the order of trouble occurred most frequently based on past results which have been separately investigated or in the order of various sensors which have been provided to the membrane separation activated-sludge tank 3 and registered beforehand. The alarm outputting may be separately recorded to successively change the details thereof so as to result in the order of frequent troubles for each treatment step. Examples of the chemical include acids and alkalis for use in regulating the pH of the activated sludge, and further include flocculants which are added to the wastewater 1 in the membrane separation activated-sludge tank 3 or upstream therefrom to aggregate aqueous-phase suspended matter or dissolved substances beforehand and antifoaming agents for inhibiting the activated sludge from frothing.

In cases when an image of activated sludge collected from a membrane separation activated-sludge tank is taken with an optical means and processed to assess the aqueous-phase suspended matter amount in the activated sludge and a flocculant is added to the sludge in accordance with the assessment result, then it is preferred to first perform an operation for reducing (A) the water-to-be-treated inflow rate and (B) the filtration rate and then perform an operation for (F) flocculant addition. This is for preventing the flocculant itself from clogging the membranes, by sufficiently mixing the sludge with the flocculant before filtration and incorporating aqueous-phase suspended matter into the flocs to make the flocs have a larger diameter than the membrane pores and be suitable for membrane filtration, before the membrane filtration is conducted.

After the addition of the flocculant, an image of activated sludge collected again from the membrane separation activated-sludge tank is taken with the optical means and processed and the aqueous-phase suspended matter amount in the activated sludge and (vi) the area of floc regions each having an area not larger than a certain value and surrounded by an aqueous-phase region and/or the areal ratio thereof to aqueous-phase regions or floc regions are assessed to ascertain that they have become within the control reference range. Thereafter, (A) the water-to-be-treated inflow rate and (B) the filtration rate are returned to the conditions of before the reduction. Thus, the filtration operation can be continued while preventing the flocculant itself from clogging the membranes.

In addition, according to the present invention, by taking images of the activated sludge with an optical means before and after the change in operating conditions and processing the images, the effect thereof can be instantly assessed without necessitating a conventional analysis with a water analyzer. There is hence an effect that the time period required for changing the conditions is greatly shortened.

Use of filtration membranes over a prolonged period renders the filtration pressure prone to increase due to the deposits which have accumulated on the membrane surfaces. There are hence cases where a chemical, such as sodium hypochlorite or an inorganic acid, is introduced into a cleaning-chemical addition tank 16 to periodically clean (M) the membrane elements immersed in the membrane separation activated-sludge tank 3 in order to temporarily remove the membrane surface deposits, or where the membrane elements immersed in the membrane separation activated-sludge tank 3 are replaced, depending on the period of use.

In such cases also, the activated sludge is monitored before and after the cleaning or replacement, in accordance with this embodiment, to ascertain that the activated sludge is not adversely affected. If an adverse influence was observed, it is possible to change the cleaning conditions or to select control whereby a flocculant or a chemical for pH neutralization is first added after the cleaning to condition the sludge and the filtration operation is then restarted.

In cases when specific membrane elements only periodically suffer an increase in filtration pressure, a preferred procedure is as follows. Activated sludge is collected from around these membrane elements and (viii) the area of floc regions each having a color tone or a brightness not higher than a certain value and/or the areal ratio thereof to aqueous-phase regions or floc regions is monitored. In cases when the area or areal ratio of said floc regions exceeds a control range, there is a possibility that aeration tubes lying under these membrane elements might have been clogged. Hence, the air pump 7 is regulated for flow rate to clean (N) the aeration tubes 8, or, for example, rubber resin members as components of the aeration tubes are replaced.

Meanwhile, the suction pump 9 may be controlled to regulate (C) the filtration period or filtration suspension period or the air pump 7 may be controlled to increase or reduce (D) the aeration-air feed rate or aeration period or controlled intermittently, in accordance with the state of the activated sludge in the membrane separation activated-sludge tank 3. It is also preferred to regulate (C) the filtration period or filtration suspension period and (D) the aeration-air feed rate or aeration period, in combination.

According to this embodiment, a preferred procedure is as follows. (viii) the area of floc regions each having a color tone or a brightness not higher than a certain value and/or the areal ratio thereof to aqueous-phase regions or floc regions is monitored by continuously or periodically imaging the activated sludge. In cases when the color tone of the floc regions has changed from brown to black, an alarm indicating that "dissolved oxygen concentration in activated-sludge tank may have decreased" is displayed. In accordance with the indication, measurement of the dissolved oxygen concentration in the activated-sludge tank is performed to ascertain whether or not the air-pump air feed rate has decreased to below a control range. In cases when the air feed rate is not problematic, there is a possibility that the aeration tube might have been clogged to cause uneven air supply in a part of the tank. Hence, (N) cleaning of the aeration tube is conducted. In the case where there is a plurality of aeration tubes 8, a preferred procedure is as follows. Activated sludge is collected form a plurality of portions of the membrane separation activated-sludge tank 3 in order to decide the order of cleaning, and is each examined to assess (viii) the area of floc regions each having a color tone or a brightness not higher than a certain value and/or the areal ratio thereof to aqueous-phase regions or floc regions. In cases when the area or areal ratio for the activated sludge from any of the portions exceeds a control range, there is a possibility that the aeration tube around that portion might have been clogged. Consequently, the air pump 7 is regulated for flow rate to preferentially clean the aeration tube 8 around that portion, or, for example, rubber resin members as components of the aeration tube are replaced.

Also usable besides these is the following configuration. In the case of wastewater treatment facilities in which (A) the concentration of inflow water to be treated and the inflow rate are apt to fluctuate, the suction pump 9 is controlled to regulate (C) the filtration period or filtration suspension period or the air pump 7 is controlled to increase or reduce (D) the aeration-air feed rate or aeration period or controlled intermittently, in accordance with (A) the concentration of inflow water to be treated and the inflow rate, while monitoring the activated sludge in the membrane separation activated-sludge tank 3 to ascertain that it is not adversely affected. (C) and (D) may be regulated in combination.

In the case where the water to be treated contains a pigment ingredient and a decoloring step is provided after the membrane separation activated-sludge tank 3, this system may be operated in the following manner. Activated sludge is collected from the membrane separation activated-sludge tank 3 and examined to assess (viii) the area of floc regions each having a color tone or a brightness not higher than a certain value and/or the areal ratio thereof to aqueous-phase regions or floc regions. In cases when the area or areal ratio exceeds a control range, a notice indicating "check operating conditions for post-treatment step" is displayed, and (J) the post-treatment step, although not shown in the drawing, is performed so as to associate, for example, with a device for adding a decoloring chemical and to add the chemical only when the addition is necessary. Thus, the amount of the chemical to be added is optimized, leading to a reduction in chemical use amount.

This embodiment is suitable also for monitoring a step preceding a membrane separation activated-sludge treatment. For example, ordinary floc shapes are memorized beforehand and in cases when the amount of foreign matter of irregular shapes different from the ordinary ones has increased in the activated sludge, an alarm requiring to check (I) the pretreatment step is output. In accordance with the alarm, check of the state of the screen is performed to ascertain whether there is no bypass inflow of water to be treated due to the clogging of the screen.

Figure 5:
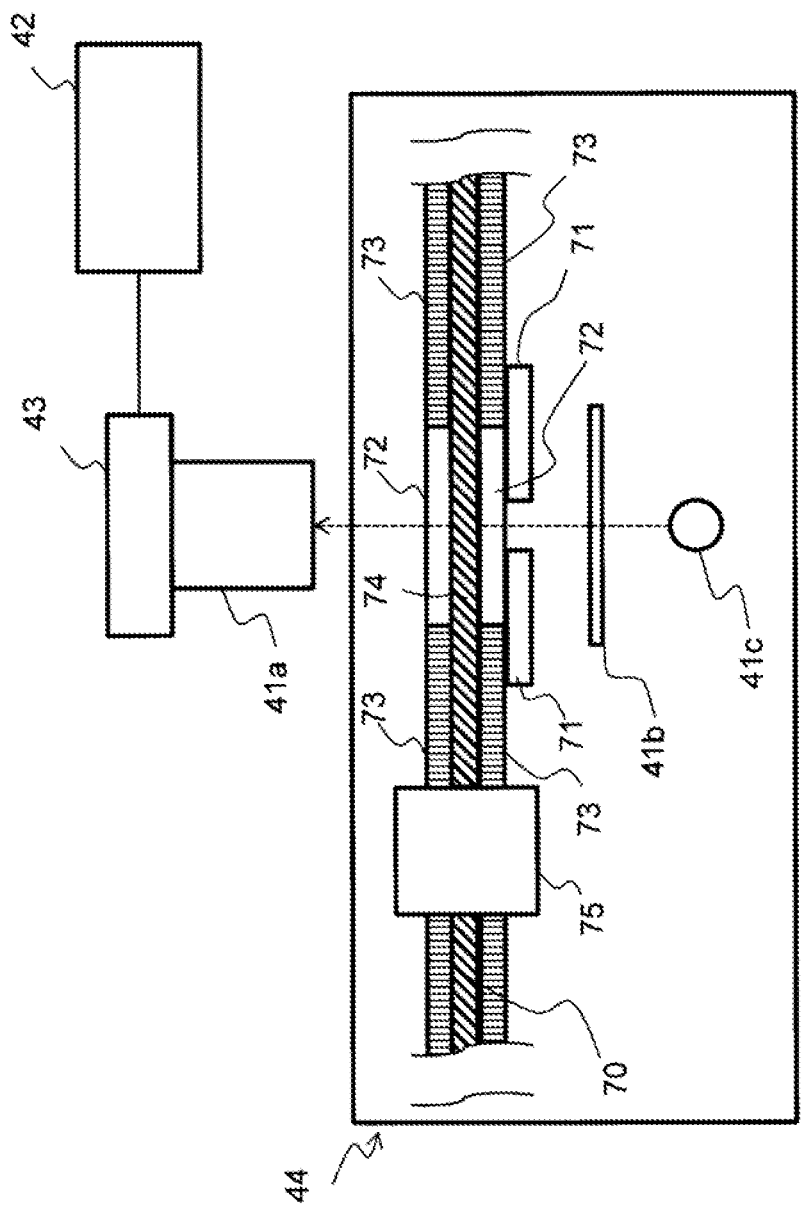
FIG. 5 is a diagrammatic view illustrating an embodiment of an examination jig according to the present invention.

FIG. 5 schematically illustrates the configuration of an examination jig 44 for use in continuously examining activated sludge in one embodiment of the present invention. The examination jig 44 includes: an evaluation channel 74 having a gap of 0.01-0.1 mm configured of a pair of transparent members 72, made of, for example, a transparent glass or an acrylic resin, arranged opposite each other vertically and placed on a table 71; and an activated-sludge conveyance channel 73 that communicates with a liquid-sending line 46, which has been directly connected to a water treatment tank, and the evaluation channel 74. Activated sludge 70 is imaged with an optical means 41 and a camera 43 through a liquid-sending means 75, which sends the activated sludge 70 to the evaluation channel 74, and through the evaluation channel 74. The optical means 41 includes: a lens 41a; a phase-contrast/bright-field switching optical filter means 41b for examining the activated sludge 70 while switching between phase-contrast image and bright-field image; and a light source 41c. The members for maintaining the gaps in the activated-sludge conveyance channel 73 and evaluation channel 74 of the examination jig 44 are not particularly limited in the material thereof. However, acrylic resins and metals such as stainless steels, which are easy to process, are preferred. From the standpoints of chemical resistance and wear resistance, stainless steel (SUS) 316 is preferred.

Here, how the examination jig 44 for use in continuously examining activated sludge works is explained.

Activated sludge 70 is sent by the liquid-sending means 75 from a membrane separation activated sludge tank 3 via the activated-sludge conveyance channel 73 to the evaluation channel 74 formed by the transparent members 72 placed on the table 71. The liquid-sending means 75 is equipped with a liquid-sending control means (not shown) for controlling the liquid-sending rate. The liquid-sending means 75 may send activated sludge 70 which has been collected in advance in a vessel not shown, or may collect activated sludge via a movable collection port 53 disposed in the membrane separation activated-sludge tank 3. The liquid-sending control means is not particularly limited so long as activated sludge 70 can be smoothly sent. It is, however, preferable that the rate of liquid sending can be selected, for example, from an increase or reduction or constant rate. It is preferred to stop the liquid sending for a certain time period during imaging. In place of stopping the liquid sending for a certain time period during imaging, both sides (the inlet and outlet for the activated sludge) of the evaluation channel 74 may be physically closed. For the physical closing, electromagnetic valves may, for example, be disposed at both ends of the transparent channel. The liquid-sending means 75 desirably is a pump or the like which, in response to external electrical signals, can start or stop liquid sending or control the rate of liquid sending. However, the liquid-sending means 75 is not limited thereto. During imaging, the sending of the activated sludge is temporarily stopped to allow the system to stand still for a certain time period. Alternatively, a physical closing means, such as electromagnetic valves, for closing the inlet side and outlet side of the evaluation channel 74 is used to temporarily stop the flow of the activated sludge 70 and perform imaging. By thus imaging the activated sludge 70 in the state of not flowing, floc regions and aqueous-phase regions are distinguished from each other to determine the aqueous-phase suspended matter amount with satisfactory accuracy.

The spacing of the gap between the pair of transparent members 72 constituting the evaluation channel 74 is not particularly limited. However, in view of the sizes of flocs, it is preferably 0.01-0.1 mm. It is preferable that the gap between the transparent members 72 constituting the evaluation channel 74 is made to have an inclination so that the channel becomes narrower toward the portion where the spacing is 0.01-0.10 mm. It is also preferable that a regulation function for regulating the spacing of the gap is imparted to make the gap between the transparent members 72 differ between the period of activated-sludge sending and the period of examination, in order to diminish clogging during activated-sludge sending. By thus changing the gap of the evaluation channel 74, the spacing of the gap can be kept suitable only during the period of examination and the gap can be kept wide during the other period, making it possible to prevent the activated sludge from clogging the channel. Furthermore, this configuration is preferred because as stated hereinabove, the thickness of the channel is deliberately changed during the period of examination to change the shape of the activated sludge in the thickness direction and thereby examine the floc regions for any difference between the images of before and after the change, and the density, degree of aggregation, constituent components, etc. of the activated sludge can be quantitatively evaluated in accordance with the difference. The regulation function for changing the gap of evaluation channel 74 is not particularly limited, and the vertical thickness of the gap may be changed with electrical signals or manually. Use may also be made of a configuration in which the light to be transmitted is changed in intensity or kind, with the thickness of the channel being kept constant, thereby quantifying the thickness-direction density, degree of aggregation, constituent components, etc. of the activated sludge together with positional information. In particular, it is also preferable that microorganisms are marked beforehand with a fluorescent pigment or the like and a fluorescent microscope is used to quantify the density, degree of aggregation, etc. of the marked microorganisms together with positional information. It is noted that the activated sludge collected from the membrane separation activated-sludge tank 3 may vary in the state thereof depending on the situation in which the activated sludge has been stirred. For example, the activated sludge in a bottom portion of the tank stagnates, while the activated sludge near the water surface in the tank contains a large amount of floating components such as oil. It is therefore preferred to collect activated sludge in an average state within the tank. Because of this, the collection port 53 is movable in the depth direction so that activated sludge can be collected from any desired position, along the depth direction, in the membrane separation activated-sludge tank. Due to this, activated sludge which is average along the depth direction of the membrane separation activated-sludge tank can be collected. For example, in cases when activated sludge is collected at three depths and there is an increased difference in the total area of floc regions among the activated-sludge samples from the respective depths, then it is deemed that the aeration tubes for stirring have partly been clogged to result in uneven stirring state of the activated sludge. In this case, (N) cleaning of the aeration tubes 8 may be performed or rubber resin members as components of the aeration tubes may be replaced.

With respect to collection methods, three collection ports to which tubes for collection respectively having three different lengths have been attached may, for example, be immersed in the activated-sludge tank, although not shown. Alternatively, use may be made of a method in which a collection tube having three collection ports provided in the depth direction, each equipped with an on-off valve is immersed beforehand in the activated-sludge tank and, at a preset time, one of the three valves is opened to suck the sludge, with the remaining valves being kept closed.

Also usable besides these is a configuration in which a stretching function and a directing function are given to the collection port 53 and the collection port 53 is first moved horizontally in an upper portion of the activated-sludge tank to a desired position and then moved in the depth direction to collect activated sludge.

As the liquid-sending line 46 for activated sludge, which extends from the collection port 53 to the suction pump 47 and to the activated-sludge visualizer 52, use may be made of tubes or hoses for general use, rigid poly(vinyl chloride) (HIVP) or stainless-steel pipes used in water line piping, etc. The materials of the tubes or hoses are not particularly limited, and commonly-used silicones, nylons, polypropylene, polyurethanes, and the like are suitable.

The transparent members 72 are disposed on both sides of the evaluation channel 74 so that light passes vertically through the plane of the evaluation channel 74, and a light source 41c and a lens 41a and a camera 43, which are for examining and imaging, are disposed. The position of a phase-contrast/bright-field switching optical filter means 41b is regulated so that it is disposed in a proper position. Light from the light source 41c passes through the phase-contrast/bright-field switching optical filter means 41b, the transparent members 72, which constitute the evaluation channel 74, and activated sludge 70 as indicated by the arrow in the drawing. This light is captured by the camera 43, to which the lens 41a has been attached. The image taken with the camera 43 is sent to an image processing means 42. Although the lens 41a is not particularly limited so long as a necessary magnification and filed of view can be ensured, it is preferred to use an objective lens having a magnification suitable for the sizes of flocs and aqueous-phase suspended matter. Lenses differing in magnification may be used for respective purposes. The phase-contrast/bright-field switching optical filter means 41b is configured of a ring slit, a phase difference plate, a dedicated objective lens, etc. so that examination can be performed with switching between phase-contrast image and bright-field image. In the case of obtaining a phase-contrast image, examination is performed through the ring slit, phase difference plate, dedicated objective lens, etc. In the case of taking a bright-field image, examination is performed without through the ring slit, phase difference plate, dedicated objective lens, etc. Switching with the phase-contrast/bright-field switching optical filter means 41b may be controlled by electrical signals, or the switching may be manually conducted by the examiner at any time. Furthermore, use may be made of a configuration in which the evaluation channel has a plurality of planes through which light can pass in upside/downside and right-hand/left-hand directions and the light to pass is applied from a plurality of directions, or in which the imaging can be performed from a plurality of directions with the camera 43, although those are not shown in the drawing. The examination jig itself or the evaluation channel may be made to have a rotatable structure in order to make the evaluation channel easy to image from other directions.

The membrane separation activated sludge contains a large amount of gaseous ingredients, such as the gas introduced through the aeration tubes 8 and gas bubbles evolved by the biotreatment. In cases when the activated sludge in the state of containing such gases is imaged with the optical means 41 and the camera 43, this image may be unable to be accurately processed by the image processing means 42. Accurate processing is rendered possible by disposing a degassing device 45 in the liquid-sending line 46, which is for sending activated sludge to the optical means 41, and removing the gaseous ingredients from the activated sludge.

The degassing device 45 may generally be any device, such as a ball valve, a needle valve, or the like, so long as the device has a mechanism capable of discharging gases. From the standpoint of making efficient gas discharge possible, it is preferred to attach the degassing device 45 in an upper portion of the liquid-sending line 46.

This embodiment includes an assessment means 48 which deems the activated sludge collected from the separation membrane activated-sludge tank to be abnormal, when an image of the activated sludge is taken by the imaging means including the optical means 41 and the camera 43 and processed by the image processing means 42 and the result of the image processing is outside a preset control reference range.

As stated hereinabove, a camera having a calculation function is preferred because after imaging, the image can be processed under preset conditions to instantly calculate an image information element. With respect to the assessment as to whether or not the result is outside a control reference range, assessment requirements may be incorporated into a software for controlling the camera, on the basis of assessment formulae produced beforehand from past results and findings from preliminary investigations, or the assessment may be also made with a personal computer or the like into which the assessment formulae have been imported, by inputting the results of image processing thereinto. Each of these has been connected to an alarm output means 49 for abnormality alarm outputting and lets an alarm be output in cases when an assessment result is outside a preset control reference range. A monitor may be disposed to display a captured image, image processing conditions, assessment result, or details of the alarm on the monitor in accordance with the assessment result. It is more preferable that a method for controlling any of the wastewater treatment conditions (A) to (N) described above is also displayed in accordance with the assessment result.

The frequency of evaluation in this embodiment is not particularly limited. Preferred is the following. In cases when the membrane separation activated-sludge tank is being stably operated, evaluation is performed, for example, once a day over about 1 hour. After control of any of the wastewater treatment conditions (A) to (N) has been performed by the control means 50 in accordance with an assessment result, the evaluation is continuously performed until the activated sludge can be ascertained to have come into a stable state.

Examples of the evaluation include to conduct about 30 sets each including collection of sludge from the membrane separation activated-sludge tank, imaging the sludge, discharging the sludge, processing the image, and calculating an image information element. The evaluation is conducted while operating the membrane separation activated-sludge tank.

By periodically examining the activated sludge for the degree of change in the state thereof, any change in the state of the activated sludge in the membrane separation activated-sludge tank can be detected to render assessment regarding presence or absence of abnormality possible, with higher accuracy in an early stage. It is hence possible to perform control of any of various wastewater treatment conditions, which is for improving the state of the activated sludge, before an increase in membrane filtration pressure occurs.

In this embodiment, use may be made of a wastewater treatment system control program which enables the control means 50 to cause various control means for controlling the wastewater treatment conditions (A) to (N) to function in accordance with an assessment result. Alternatively, the program may be incorporated, as a recording medium readable by computers, into a wastewater treatment system. It is hence preferable that an image of activated sludge collected from a membrane separation activated-sludge tank is taken with an optical means and processed to assess the activated-sludge amount or aqueous-phase suspended matter amount and that in cases when the assessment result is outside a predetermined control reference range, an alarm is displayed and control of the various wastewater treatment conditions (A) to (N) is automatically performed.

From the standpoint of highly accurately assessing the degree of change in the state of activated sludge collected form a membrane separation activated-sludge tank, use may be made of a wastewater treatment system control program for causing at least any of the following means to function: a means for mixing activated sludge collected from the membrane separation activated-sludge tank with membrane filtrate water and taking an image of the mixture; a means whereby activated sludge collected from the membrane separation activated-sludge tank is centrifuged to obtain an aqueous phase or is separated by filtration to obtain filtrate water; a means for taking an image of the aqueous phase or filtrate water obtained; and a means whereby activated sludge collected form the membrane separation activated-sludge tank is degassed and then imaged. Alternatively, it is also preferable that the program is incorporated, as a recording medium readable by computers, into a wastewater treatment system to realize automation.

The activated-sludge images and image processing results obtained with the activated-sludge visualizer 52 according to this embodiment may be connected to a remote monitoring server via a communication appliance 54. Thus, it is possible, even in a remote place, to monitor the activated sludge, make assessment, and control the various wastewater treatment conditions (A) to (N). This activated-sludge visualizer 52 may be disposed together with a control system in common use in wastewater treatment systems, such as a PLC (programmable logic controller), which is a control unit that performs sequential control in accordance with a program, or a DCS (distributed control system), which includes control units for respective devices constituting a system and in which the devices communicate with each other and monitor mutually, so that operation data are acquired from the control system via the Internet using a remote monitoring device and placed in a cloud server disposed in any desired place.

Thus, there is no need for a worker to go to the site to ascertain the state of the activated sludge, and it is possible to control, from a remote place, the operating conditions for a membrane separation activated-sludge process and an upstream treatment process to take an improvement measure before a fatal trouble, such as an increase in filtration pressure or a deterioration in filtrate water quality, occurs. The remote place may be, for example, a control center lying in another building within the plant or may be the integrated control center in each area or country.

The present invention is for minimizing the increase in membrane filtration pressure due to a deterioration in the state of the activated sludge and thereby rendering a long-term stable operation possible, and is not particularly limited.

EXAMPLES

The present invention is explained in detail below by reference to Examples and Comparative Examples, but the present invention is not limited by the following Examples in any way.

Example 1

In fiber-production wastewater treatment facilities were disposed the membrane separation activated-sludge device (width, 0.1 m; length, 0.4 m; height, 0.8 m; tank capacity, 0.03 m$^3$) and six sheets of the flat-membrane element (0.15 m (width)×0.15 m (height); effective membrane area, 0.029 m$^2$; made of poly(vinylidene fluoride)) illustrated in FIGS. 1A to 1C. A filtration operation was initiated under the filtration conditions of a filtration flux of 0.5 m$^3$/m$^2$/day and an air supply rate of 27 L/min/module.

The biotreatment conditions included a BOD/MLSS load of 0.1 kg-BOD/kg-MLSS per day, an activated-sludge volume of 30 L, and a control reference range for activated-sludge amount of 30,000±13,000 mg/tank.

During the operation period, the activated sludge was examined at a frequency of once a day using the configuration illustrated in FIG. 2, by collecting activated sludge from the membrane separation activated-sludge tank 3, taking an image of the activated sludge with a microscope as the optical means 41 and the camera 43, subsequently processing the captured image with the image processing means 42 to distinguish floc regions and aqueous-phase regions from each other, and making a comparison with the preset control reference range to obtain an assessment result. Control was performed using the assessment result and using a control program for displaying an alarm in cases when the calculated value was outside the control reference range.

On about the seventh day after initiation of the operation, the activated-sludge amount was calculated from (a) the total area of floc regions, which was a control parameter determined from the image, at "34,500" and an alarm "regulate activated-sludge amount" was displayed. Hence, within the day, regulation was performed in which the activated-sludge withdrawal valve of the membrane separation activated-sludge device was opened to withdraw 5 L of the activated sludge and the tank was replenished with membrane separation activated-sludge treated water in the same amount. On the next day, activated sludge was collected and an image thereof was taken with the microscope and processed. As a result, the activated-sludge amount was displayed as "28,500" and no alarm was displayed.

Such operation control was continued for about three months, during which no increase in membrane filtration pressure was observed.

A calibration curve indicating a correlation between the total area of floc regions and the converted mixed liquor suspended solid concentration (MLSS) was used to conduct conversions in order to impart interchangeability with a conventional method in which mixed liquor suspended solid concentration (MLSS) was used. As a result, the obtained converted values was consistent with the estimated values. It was understood that the control parameter obtained from an image according to the present invention was proper.

Comparative Example 1

A membrane separation activated-sludge device (having the same device configuration as that of Example 1) was disposed, separately from that of Example 1, in the fiber-production wastewater treatment facilities, and a filtration operation was initiated simultaneously with Example 1 under the same filtration conditions (filtration flux, 0.5 m$^3$/m$^2$/day; air supply rate, 27 L/min/module). The biotreatment conditions included a BOD/MLSS load of 0.1 kg/kg per day and a control reference range for mixed liquor suspended solid concentration (MLSS) of 10,000±1,000 mg/L, as in Example 1.

On about the seventh day after initiation of the operation, activated sludge was collected and sent to an analysis service and a request for MLSS measurement was made thereto. Six days after the request, a report on the results was received from the analysis service, showing that the concentration had been "11,500 mg/L". Hence, on the day (about one week after the last collection of activated sludge), regulation was performed in which the activated-sludge withdrawal valve of the membrane separation activated-sludge device was opened to withdraw 5 L of the activated sludge and the tank was replenished with membrane separation activated-sludge treated water in the same amount. After the regulation, sludge was collected and sent to the analysis service and a request for the measurement was made thereto. Six days after the request, a report on the results was received from the analysis service, showing that the concentration had been "10,800 mg/L". Then, about one week after the last collection of activated sludge, regulation was performed in which the activated-sludge withdrawal valve of the membrane separation activated-sludge device was opened to withdraw 5 L of the activated sludge and the tank was replenished with membrane separation activated-sludge treated water in the same amount. After the regulation, activated sludge was collected and sent to the analysis service and a request for the measurement was made thereto. Six days after the request, a report on the results was received from the analysis service, showing that the concentration had been "10,300 mg/L". At the time when such operation control had been continued for one month, the analysis service came into a busy season and the results of the measurement were unable to be obtained therefrom. Because of this, operation was performed for one month without performing the withdrawal of activated sludge. During this operation, a tendency was observed in which the membrane filtration pressure increased to about 1.5 times that just after initiation of the operation. Hence, about 1.1 month after the last collection of activated sludge, activated sludge was collected and sent to the analysis service and a request for the measurement was made thereto. As a result, six days after the request, a report on the results was received form the analysis service, showing that the concentration had been "20,000 mg/L", which had been outside the control reference range. Due to such time lag between the collection of activated sludge and assessment of the results, it was too late to perform control for improving the state of the activated sludge.

Example 2

In fiber-production wastewater treatment facilities were disposed two membrane separation activated-sludge devices side by side which each were the device (width, 2 m; length, 1 m; height, 3 m; tank capacity, 6 m$^3$) and 100 sheets of the flat-membrane element (0.5 m (width)×1.4 m (height); effective membrane area, 1.4 m$^2$; made of poly(vinylidene fluoride)) for each device, illustrated in FIGS. 1A to 1C. A filtration operation was initiated under the filtration conditions of a filtration flux of 0.4 m$^3$/m$^2$/day and an air supply rate of 27 L/min/module.

The biotreatment conditions included a BOD/MLSS load of 0.1 kg/kg per day, an activated-sludge volume of 3 m$^3$, and a control reference range for activated-sludge amount of 30±3 kg/tank. With respect to one of the two membrane separation activated-sludge devices, the activated sludge was examined at a frequency of once a day during the operation period using the configuration illustrated in FIG. 2, by collecting activated sludge from the membrane separation activated-sludge tank 3, taking an image of the activated sludge with the optical means 41 and the camera

43, subsequently processing the captured image with the image processing means 42, calculating the activated-sludge amount from (i) the total area of floc regions, which was a control parameter determined from the image, and the aqueous-phase suspended matter amount from (vi) the areal ratio of floc regions each having an area not larger than a certain value and surrounded by an aqueous-phase region to aqueous-phase regions, which was another control parameter determined from the image, and making comparisons with preset control reference ranges to obtain an assessment result. Control was performed using the assessment result and using a control program for displaying an alarm in cases when the calculated value was outside the control reference range.

At the time when three months had passed since initiation of the operation, an image of the activated sludge in the tank was taken. As a result, the activated-sludge amount was calculated from (i) the total area of floc regions, which was a control parameter determined from the image, at "28.5" and the aqueous-phase suspended matter amount was calculated from (vi) the areal ratio of floc regions each having an area not larger than a certain value and surrounded by an aqueous-phase region to aqueous-phase regions, which was another control parameter determined from the image, at "25", and an alarm "check BOD/MLSS load" was displayed. Hence, the quality of the inflow water was checked, revealing that the BOD was as low as about ½ the ordinary value. During the period, the membrane separation activated-sludge tank had been operated at the same filtration rate as before the decrease in BOD, but the differential pressure began to increase gradually. Seven days thereafter, the differential pressure was higher than 5 kPa, which was a reference level for chemical cleaning.

It was found afterward that the production line in the factory had stopped due to periodic maintenance two days before the alarm was displayed and low-BOD wastewater only had flowed in and that the production line had restarted five days thereafter and the BOD had returned to the concentration before the decrease.

Figure 6:
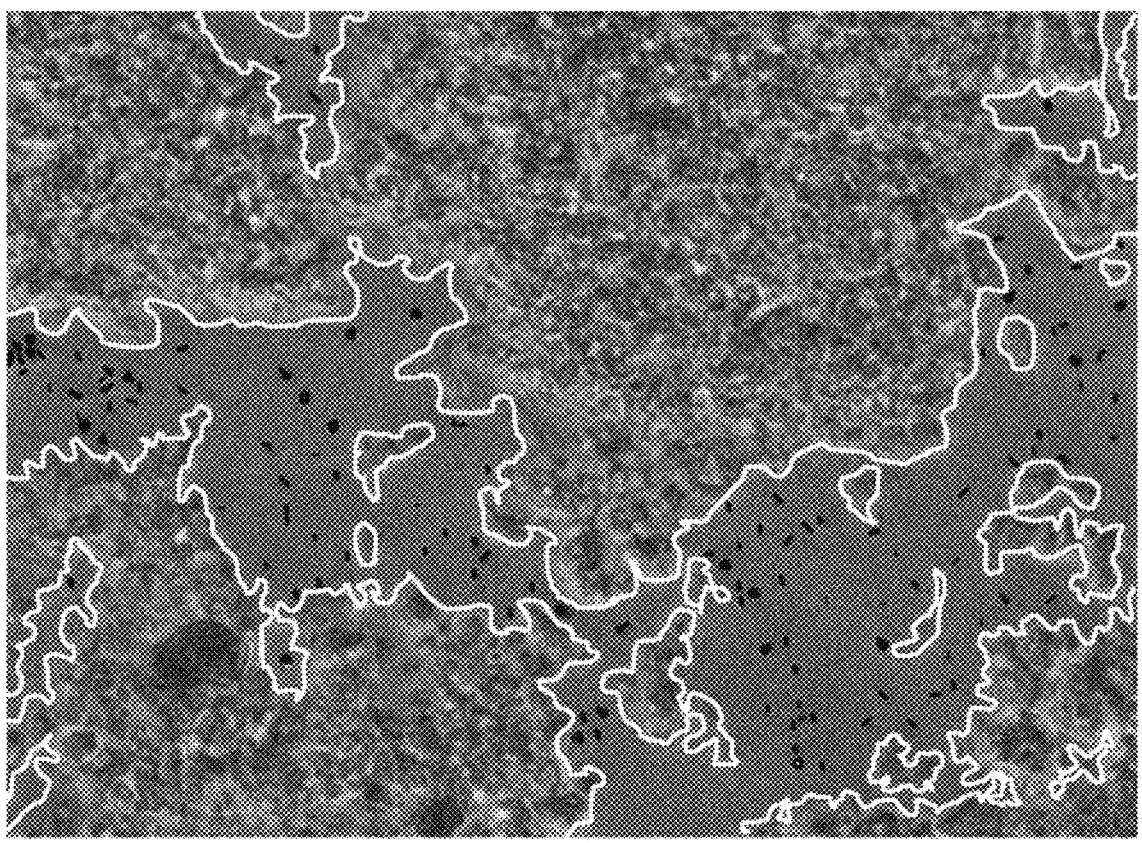
FIG. 6 is a diagrammatic view showing an image of sludge in a deteriorated state and an embodiment of a display, according to the present invention.
Figure 7:
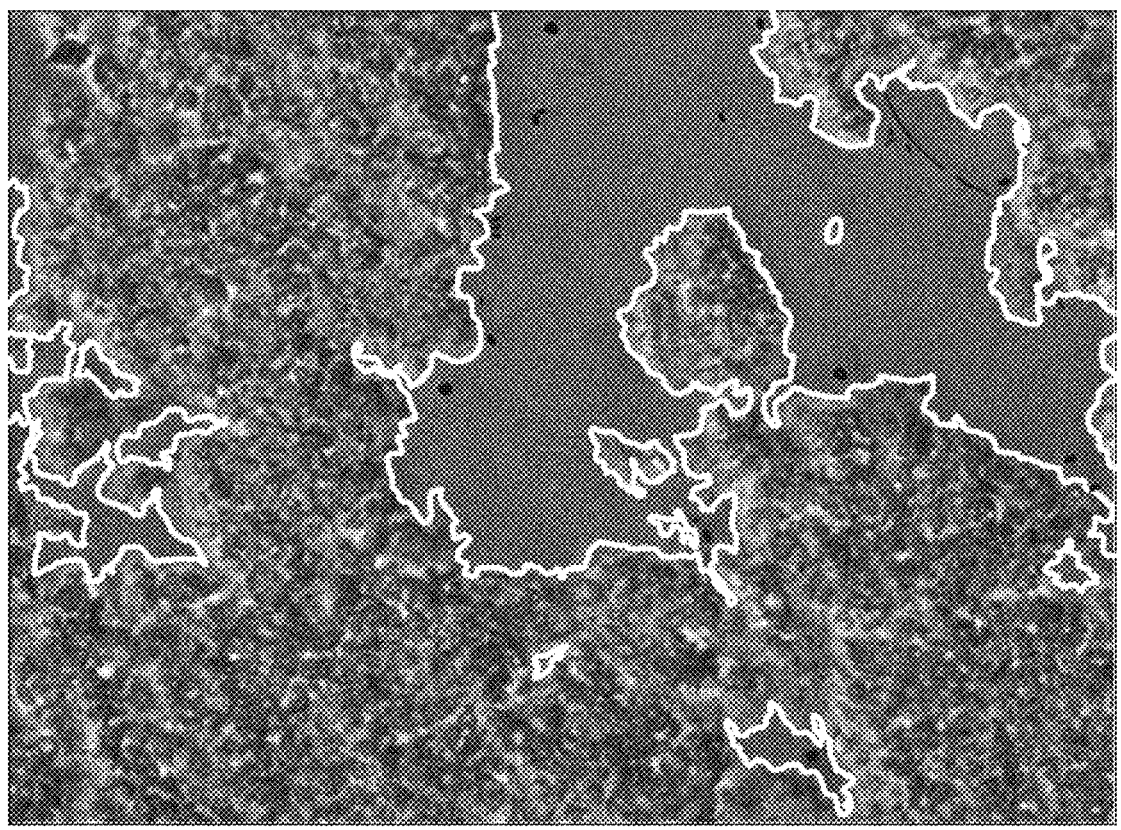
FIG. 7 is a diagrammatic view showing an image of sludge in an improved state and an embodiment of a display, according to the present invention.

Meanwhile, the differential pressure of the membranes had exceeded 5 kPa, which was a reference level for chemical cleaning, and was constant at about 10 kPa. It was hence decided to temporarily conduct chemical cleaning of the membranes. First, switching was performed to cause the inflow wastewater-to-be-treated to flow into an auxiliary tank and the membrane filtration and the aeration were stopped. The membranes were chemically cleaned with 0.5% sodium hypochlorite solution for 2 hours while being kept immersed in the activated sludge. After the chemical cleaning, the activated sludge in the tank was imaged and, as a result, the image shown in FIG. 6 was obtained. The activated-sludge amount and the aqueous-phase suspended matter amount were displayed as "28.5" and "30", respectively, and alarms "check BOD/MLSS load" and "examine the necessity of adding flocculant" were displayed. Then, a cationic polymer flocculant was added in an amount of about 1% by weight based on the dry sludge and aeration was conducted for 2 hours. Thereafter, membrane filtration was restarted at a membrane filtration flow rate which was 1/10 the ordinary flow rate. The activated sludge was imaged and, as a result, the image shown in FIG. 7 was obtained. The activated-sludge amount and the aqueous-phase suspended matter amount were displayed as "28.8" and "10", respectively, and no alarm was displayed. Consequently, switching was performed to cause the wastewater-to-be-treated which had been flowing into the auxiliary tank to flow into the membrane separation activated tank, and a membrane filtration operation was restarted at the ordinary filtration flow rate.

At the time when the operation was performed for three months after the restart of membrane filtration at the ordinary filtration flow rate, the activated-sludge amount was "27" to "33" and the aqueous-phase suspended matter amount was "5" to "10". No increase in membrane differential pressure was observed.

Comparative Example 2

The remaining one of the two membrane separation activated-sludge devices disposed in the fiber-production wastewater treatment facilities was used to initiate a filtration operation under the same filtration conditions as in Example 2 (filtration flux, 0.4 m³/m²/day; air supply rate, 27 L/min/module). As in Example 2, the biotreatment conditions included a BOD/MLSS load of 0.1 kg/kg per day, an activated-sludge volume of 3 m³, and a control reference range for activated-sludge amount of 10,000±1,000 mg/L.

With respect to this tank, a manager monitored the state of the activated sludge by examining the activated sludge at a frequency of once a week in the following manner. Activated sludge was collected from the membrane separation activated-sludge tank 3 and examined, in accordance with the method for measuring mixed liquor suspended solid concentration (MLSS) described in Sewage Test Methods (1997 edition) (published by Japan Sewage Works Association), by subjecting the activated sludge to solid-liquid separation with glass-fiber filter paper (GC-25, manufactured by Advantech-Toyo; nominal pore diameter, 1 µm), subsequently heat-drying the residual solid at 105-110° C. for about 2 hours, and, from the mass thereof, calculating the concentration of suspended substances. Filtrate obtained Through solid-liquid separation with quantitative filter paper (No. 5C, manufactured by Advantech-Toyo; nominal pore diameter, 1 µm) was measured for its turbidity with a turbidity meter (2100Q, manufactured by HACH) to determine the aqueous-phase suspended matter amount.

The operation was stable in the beginning. However, at the time when three months had passed since initiation of the operation, a low BOD state continued for about one week because of the stoppage of the production line in the factory due to periodic maintenance, as in Example 2, and the membrane separation activated-sludge tank had been operated at the same filtration flow rate as before the decrease in BOD. Because of this, the differential pressure had begun to increase gradually and exceeded 5 kPa, which was a reference level for chemical cleaning, as in Example 2.

Consequently, as in Example 2, switching was performed to cause the wastewater-to-be-treated to flow into the auxiliary tank and the filtration and aeration were stopped to conduct chemical cleaning of the membranes (2 hours). The membrane cleaning conditions and cleaning method were the same as in Example 2.

Before a filtration operation was restarted after the chemical cleaning, the state of the activated sludge in this tank was ascertained by the manager by collecting activated sludge, measuring the mixed liquor suspended solid concentration (MLSS), and determining the aqueous-phase suspended matter amount by measuring, with a turbidity meter, the turbidity of a filtrate obtained through solid-liquid separation with quantitative filter paper. Because of this, the filtration was unable to be restarted for 2.5 hours until the results were obtained.

The results of the measurements showed that the mixed liquor suspended solid concentration (MLSS) was 9,500 mg/L and the aqueous-phase suspended matter amount was about 10 times that in stable operation. However, because of limited working hours of the manager, a filtration operation was restarted at the ordinary membrane filtration flow rate without change.

Immediately after the restart of filtration operation, the membrane filtration differential pressure began to increase, and the differential pressure reached 5 kPa, which was a reference level for chemical cleaning. The manager hence was compelled to stop the filtration and conduct aeration only, before going home.

The next day, the manager collected activated sludge and measured the mixed liquor suspended solid concentration (MLSS) and the aqueous-phase suspended matter amount. As a result, the mixed liquor suspended solid concentration (MLSS) was found to be 9,500 mg/L and the aqueous-phase suspended matter amount was found to be about 25 times that in stable operation. The manager hence added the cationic polymer flocculant in an amount of about 1% by weight based on the dry sludge, conducted aeration for 2 hours, and then restarted membrane filtration at a membrane filtration rate of 1/10 the ordinary flow rate, as in Example 2.

As a result, a tendency was observed in which the membrane filtration differential pressure began to increase just after the restart of filtration operation, reached 5 kPa, which was a reference level for chemical cleaning, and remained constant thereafter. Thinking that this was due to a remaining influence of the increase in differential pressure the previous day, the manager stopped the filtration and aeration and conducted chemical cleaning of the membranes (2 hours) again.

Before a filtration operation was restarted after the chemical cleaning, the state of the activated sludge was ascertained by the manager again by collecting activated sludge, measuring the mixed liquor suspended solid concentration (MLSS), and determining the aqueous-phase suspended matter amount by measuring, with a turbidity meter, the turbidity of a filtrate obtained through solid-liquid separation with quantitative filter paper.

About 2.5 hours thereafter, the mixed liquor suspended solid concentration (MLSS) was 9,500 mg/L and the aqueous-phase suspended matter amount was about 10 times that in stable operation. However, because of limited working hours of the manager, a filtration operation was restarted at a membrane filtration flow rate which was 1/10 the ordinary flow rate. No increase in differential pressure was observed for a while. The manager hence performed regulation so that only 1/10 of the wastewater to be treated, in ordinary treatment, flowed into the membrane separation activated-sludge tank and the remainder flowed into the auxiliary tank, and then went home.

The next day, the manager collected activated sludge and measured the mixed liquor suspended solid concentration (MLSS) and the aqueous-phase suspended matter amount. At about 2.5 hours thereafter, the mixed liquor suspended solid concentration (MLSS) was found to be 9,500 mg/L and the aqueous-phase suspended matter amount was found to be about 10 times that in stable operation, showing that the activated sludge was in the same state as on the two days before.

For precaution's sake, the manager restarted a filtration operation at the ordinary membrane filtration flow rate. However, the membrane filtration differential pressure increased as expected. The manager hence deemed that with the activated sludge as such, the filtration operation was unable to be restarted, and decided to replace the activated sludge.

As compared with Example 2, this tank required much time for measuring the mixed liquor suspended solid concentration (MLSS) and aqueous-phase suspended matter amount for ascertaining the state of the activated sludge. In addition, even after the activated sludge was found to be in a deteriorated state, measures for improving the state of the sludge were left undone until the next day because of the working hours of the manager. It is thought that during such periods, the deteriorated state of the activated sludge became more serious because of, for example, a shortage in oxygen due to the suspension of aeration, which was necessary for maintaining the activated sludge, and a shortage in feed due to the suspension of water-to-be-treated supply, and this rendered the filtration operation unable to be restarted.

Comparative Example 3

In polymer-resin-production wastewater treatment facilities were disposed ten membrane modules each configured of the membrane separation activated-sludge device (width, 2.5 m; length, 10 m; height, 3 m; tank capacity 75 m$^3$) and a hundred sheets of the flat-membrane element (0.5 m (width)×1.4 m (height); effective membrane area, 1.4 m$^2$; made of poly(vinylidene fluoride)) illustrated in FIGS. 1A to 1C. A filtration operation was initiated under the filtration conditions of a filtration flux of 0.4 m$^3$/m$^2$/day and an air supply rate of 27 L/min/module.

The biotreatment conditions included a BOD/MLSS load of 0.1 kg/kg per day and a control reference range for mixed liquor suspended solid concentration of 10,000±1,000 mg/L.

There were two air pumps for aeration, each of which supplied air to five of the membrane modules. These two systems are respectively referred to as system A and system B.

Aeration tubes had been disposed under each of the membrane modules so that air struck on all the membrane elements constituting each module and the membrane surfaces were thereby cleaned to make a sludge cake (membrane deposit of activated sludge) less apt to accumulate.

At the time when three months had passed since initiation of the operation, only the five membrane modules disposed in system A showed a tendency to increase in differential pressure. The filtration was hence stopped, and the cause was examined.

As a result, the air pump of system A was found to have an air feed rate lower than a set value. Then, the piping connected to the aeration tubes was removed and each air pump was examined for air feed rate. As a result, it was ascertained that the air pump of system A had a reduced air feed rate.

When the air pump of system B was connected to the aeration tubes of system A, there was also a tendency that the air feed rate was lower than the set value. The aeration tubes to which the air pump of system A had been connected were thought to have also been clogged.

For precaution's sake, it was decided to pull the membrane modules out of the tank in order to ascertain whether no sludge cake had formed on the membrane surfaces of the membrane modules.

The next day, a truck crane was prepared, and the membrane modules located farthest from each air pump were pulled up. One of the membrane elements was withdrawn and the surfaces thereof were examined.

As a result, it was found that as compared with the membrane element of system B, which had showed no increase in differential pressure, the membrane element of system A, which had showed an increase in differential pressure, had sludge cakes formed over wide areas in the membrane surfaces and had been insufficiently cleaned due to insufficient air striking thereon.

Furthermore, the activated sludge lying around system A, which had showed an increase in differential pressure, had a dissolved oxygen concentration as low as 0.1-0.5 mg/L and some of the sludge had blackened. Meanwhile, the activated sludge lying around system B, which had showed no increase in differential pressure, had a dissolved oxygen concentration of 1-2 mg/L and had a brown color.

All the membrane elements of system A were washed with tap water to remove the cakes from the membrane surfaces and then returned to the tank. The air pumps were connected again to restart air supply. As a result, the two air pumps both showed the set air feed rate and the two systems both came to show no increase in differential pressure.

The cause of the decrease in air feed rate of the air pump of system A was the fouling of the suction air filter. Replacing the filter recovered the air feed rate.

Thereafter, in order to make system B equal in condition to system A, it was temporarily pulled out of the tank, and all the membrane elements were washed with tap water. Subsequently, the aeration tubes were washed, and the suction air filter of the air pump was replaced. The operation was then restarted.

Example 3

The same membrane separation activated-sludge device as in Comparative Example 3 was thereafter operated using the configuration illustrated in FIG. 2, by collecting activated sludge from the membrane separation activated-sludge tank 3, taking an image of the activated sludge with the optical means 41 and the camera 43, subsequently processing the captured image with the image processing means 42, and making a comparison with a preset control reference range to obtain an assessment result. Control was performed using the assessment result and using a control program for displaying an alarm in cases when the calculated value was outside the control reference range.

With respect to each of systems A and B in the activated sludge tank, activated sludge was collected, at a frequency of once a day, from a place farthest from the air pump in each membrane module and was examined.

At the time when about two months had passed since initiation of the operation, the sludge around system A had (viii) the areal ratio of floc regions each having a color tone or a brightness not higher than a certain value to aqueous-phase regions outside a control range, and alarms "check dissolved oxygen concentration" and "check aeration-air feed rate" were displayed.

The dissolved oxygen concentration of the sludge around system A was measured and was found to be as low as 0.8 mg/L. The air pump had an air feed rate slightly lower than a set value.

The filtration and the aeration were hence stopped, and the suction air filter of the air pump of system A was replaced. As a result, it was ascertained that the air feed rate became the set value. For precaution's sake, the suction air filter of the air pump of system B was also replaced.

When the air pump in which the suction air filter had been replaced was connected to the aeration tubes of system A, the air feed rate was ascertained to become the set value. The aeration tubes of system B were ascertained in the same way. The membrane filtration operation was hence restarted without cleaning the aeration tubes this time.

During this period, no increase in membrane filtration differential pressure was observed. Even after three months had passed since initiation of the operation, stable operation was possible.

By thus imaging and continuously monitoring the activated sludge, maintenance of the air pumps and aeration tubes can be rendered possible before the membrane filtration differential pressure increases.

This application is based on a Japanese patent application filed on Mar. 28, 2017 (Application No. 2017-062362), the contents thereof being incorporated herein by reference.

REFERENCE SIGNS LIST

1: Wastewater (water to be treated)
2: Immersion type membrane separation unit
2*a*: Flat-membrane element
2*b*: Flat-membrane separation functional layer
2*c*: Flat-membrane base
2*d*: Frame
3: Membrane separation activated-sludge tank
4: Filtrate water tank
5: Filtrate water
6: Raw-water feed pump
7: Air pump (air supply device)
8: Aeration tube
8*a*: Air bubbles
9: Suction pump
10: Activated-sludge withdrawal pump
11: Withdrawn activated sludge (excess activated sludge)
12: Nutrient salt addition tank
13: Nutrient salt addition pump
14: Chemical addition tank
15: Chemical addition pump
16: Cleaning chemical addition tank
17: Cleaning chemical addition pump
18*a*: Nutrient salt addition channel switching valve
18*b*: Nutrient salt addition channel switching valve
19*a*: Cleaning chemical channel switching valve
19*b*: Cleaning chemical channel switching valve
20: Cleaning chemical discharge valve
21: Auxiliary tank
22: Auxiliary-tank effluent
23: Auxiliary-tank liquid-sending pump
24: Auxiliary-tank discharge pump
25: Wastewater (water to be treated) channel switching valve
41: Optical means
41*a*: Lens
41*b*: Phase-contrast/bright-field switching optical filter means
41*c*: Light source
42: Image processing means
43: Camera
44: Examination jig
45: Degassing device
46: Liquid-sending line
47: Suction pump
48: Assessment means (assessment unit)
49: Alarm output means (alarm output part)
50: Control means
51: Activated-sludge visualization control part
52: Activated-sludge visualizer
53: Collection port
54: Communication appliance 61: Floc region
62: Aqueous-phase region (non-floc region)
70: Activated sludge
71: Table
72: Transparent member
73: Activated-sludge conveyance channel
74: Evaluation channel
75: Liquid-sending means

The invention claimed is:

1. A wastewater treatment method utilizing a membrane separation activated-sludge method, comprising the steps of:
taking an image of an activated sludge collected from a membrane separation activated-sludge tank;
processing the image taken; and
comparing a control parameter determined from information of the processed image with a preset control reference range to assess an operating state of the membrane separation activated-sludge tank, said information includes at least one of hue, lightness, saturation, number of pixels, chromaticity and brightness,
wherein the control parameter is an aqueous-phase suspended matter amount in the activated sludge, and
wherein the method further comprises:
calculating a total area of floc regions each having an area not larger than a predetermined value and surrounded by an aqueous-phase region, per unit area of a field of view, wherein floc regions that each have an area larger than the predetermined value are excluded from said step of calculating the total area; and
comparing at least one of the calculated value and a change amount in the calculated value with a lapse of time, with the preset control reference range to assess the operating state of the membrane separation activated-sludge tank.

2. The wastewater treatment method according to claim 1, wherein, in taking the image of the activated sludge collected from the membrane separation activated-sludge tank, the image is taken after degassing and/or stirring at least any one of a liquid mixture obtained by mixing the activated sludge with a membrane filtrate water, and an aqueous phase portion obtained by centrifuging the activated sludge.

3. The wastewater treatment method according to claim 1, further comprising:
when the control parameter has been assessed to be outside the control reference range, outputting at least one of an alarm and a control information regarding a wastewater treatment condition.

4. The wastewater treatment method according to claim 3, wherein the wastewater treatment condition, regarding which at least one of the alarm and the control information is output when the control parameter has been assessed to be outside the control reference range, is at least any one of the following:
(A) concentration of inflow water to be treated and inflow rate,
(B) filtration rate,
(C) filtration period or filtration suspension period,
(D) aeration-air feed rate or aeration period,
(E) nutrient salt addition amount,
(F) chemical addition amount,
(G) amount of activated sludge,
(H) treated-water return rate,
(I) operating conditions for pretreatment step,
(J) operating conditions for post-treatment step,
(K) temperature regulation conditions for activated-sludge tank,
(L) operating conditions for membrane elements,
(M) cleaning conditions for membrane elements, and
(N) cleaning conditions for aeration tubes.

5. The wastewater treatment method according to claim 3, wherein the assessment is made at a place which is remote from a place where the image of the activated sludge collected from the membrane separation activated-sludge tank is taken, the place where the image of the activated sludge collected from the membrane separation activated-sludge tank is taken being connected to said place where the assessment is made by a communication appliance, thereby outputting at least one of the alarm and the control information.

6. The wastewater treatment method according to claim 3, further comprising controlling the wastewater treatment condition on the basis of the control information output.

7. The wastewater treatment method according to claim 6, further comprising the steps of:
processing the image to assess the aqueous-phase suspended matter amount in the activated sludge;
when the result is higher than the preset control reference range, performing an operation for reducing at least one of a water-to-be-treated inflow rate and a filtration rate; and
when the result is lower than the preset control reference range, performing an operation for increasing at least one of the water-to-be-treated inflow rate and the filtration rate.

* * * * *